US009436185B2

(12) United States Patent
Schnittman

(10) Patent No.: US 9,436,185 B2
(45) Date of Patent: Sep. 6, 2016

(54) COVERAGE ROBOT NAVIGATING

(75) Inventor: Mark Steven Schnittman, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/340,802

(22) Filed: Dec. 30, 2011

(65) Prior Publication Data

US 2012/0173070 A1    Jul. 5, 2012

Related U.S. Application Data

(60) Provisional application No. 61/428,793, filed on Dec. 30, 2010.

(51) Int. Cl.
*G05D 1/02* (2006.01)

(52) U.S. Cl.
CPC ............ *G05D 1/024* (2013.01); *G05D 1/0227* (2013.01); *G05D 1/027* (2013.01); *G05D 1/0242* (2013.01); *G05D 1/0246* (2013.01); *G05D 1/0255* (2013.01); *G05D 1/0272* (2013.01); *G05D 2201/0215* (2013.01)

(58) Field of Classification Search
CPC .. G05D 1/024; G05D 1/0227; G05D 1/0242; G05D 1/0246; G05D 1/0255; G05D 1/027; G05D 1/0272; G05D 2201/0215
USPC ..................... 701/23, 26; 180/169; 356/5.01; 700/245, 250, 253; 705/26
See application file for complete search history.

(56) References Cited

U.S. PATENT DOCUMENTS

| 4,119,900 A | 10/1978 | Kremnitz |
| 4,196,727 A | 4/1980 | Verkaart et al. |
| 4,198,727 A | 4/1980 | Farmer |
| 4,556,313 A | 12/1985 | Miller, Jr. et al. |
| 4,596,412 A | 6/1986 | Everett et al. |
| 4,638,445 A | 1/1987 | Mattaboni |
| 4,674,048 A | 6/1987 | Okumura |
| 4,703,820 A | 11/1987 | Reinaud |
| 4,769,700 A | 9/1988 | Pryor |
| 4,851,661 A | 7/1989 | Everett, Jr. |
| 4,854,006 A | 8/1989 | Nishimura et al. |

(Continued)

FOREIGN PATENT DOCUMENTS

| CN | 101108482 | 1/2008 |
| CN | 12114635 | 7/2011 |

(Continued)

OTHER PUBLICATIONS

Authorized Officer Joaquín Vañóo Gea, International Search Report and Written Opinion corresponding to international application No. PCT/US2011/068071 dated May 2, 2012, 14 pages.

(Continued)

*Primary Examiner* — Aaron L Troost
(74) *Attorney, Agent, or Firm* — Fish & Richardson P.C.

(57) ABSTRACT

A method of navigating an autonomous coverage robot on a floor includes controlling movement of the robot across the floor in a cleaning mode, receiving a sensor signal indicative of an obstacle, rotating the robot away from the sensed obstacle, determining a change in the received sensor signal during at least a portion of the rotation of the robot away from the sensed obstacle, and identifying the sensed obstacle based at least in part on the determined change in the received sensor signal.

32 Claims, 19 Drawing Sheets

(56) References Cited

U.S. PATENT DOCUMENTS

| | | |
|---|---|---|
| 4,855,915 A | 8/1989 | Dallaire |
| 4,878,003 A | 10/1989 | Knepper |
| 4,887,415 A | 12/1989 | Martin |
| 4,893,025 A | 1/1990 | Lee |
| 4,949,277 A | 8/1990 | Trovato et al. |
| 4,962,453 A | 10/1990 | Pong et al. |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,032,775 A | 7/1991 | Mizuno et al. |
| 5,040,116 A | 8/1991 | Evans, Jr. et al. |
| 5,051,906 A | 9/1991 | Evans, Jr. et al. |
| 5,086,535 A | 2/1992 | Grossmeyer et al. |
| 5,107,946 A * | 4/1992 | Kamimura et al. ......... 180/169 |
| 5,109,566 A | 5/1992 | Kobayashi et al. |
| 5,142,985 A | 9/1992 | Stearns et al. |
| 5,165,064 A | 11/1992 | Mattaboni |
| 5,170,352 A | 12/1992 | McTamaney et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,276,618 A | 1/1994 | Everett, Jr. |
| 5,279,672 A | 1/1994 | Betker et al. |
| 5,284,522 A | 2/1994 | Kobayashi et al. |
| 5,293,955 A | 3/1994 | Lee |
| 5,307,273 A | 4/1994 | Oh et al. |
| 5,341,540 A | 8/1994 | Soupert et al. |
| 5,353,224 A | 10/1994 | Lee et al. |
| 5,400,244 A | 3/1995 | Watanabe et al. |
| 5,446,356 A | 8/1995 | Kim |
| 5,446,445 A | 8/1995 | Bloomfield et al. |
| 5,502,638 A | 3/1996 | Takenaka |
| 5,568,589 A | 10/1996 | Hwang |
| 5,613,261 A | 3/1997 | Kawakami et al. |
| 5,621,291 A | 4/1997 | Lee |
| 5,652,489 A | 7/1997 | Kawakami |
| 5,682,313 A | 10/1997 | Edlund et al. |
| 5,781,697 A | 7/1998 | Jeong |
| 5,787,545 A | 8/1998 | Colens |
| 5,812,267 A | 9/1998 | Everett, Jr. et al. |
| 5,815,880 A | 10/1998 | Nakanishi |
| 5,894,621 A | 4/1999 | Kubo |
| 5,903,124 A | 5/1999 | Kawakami |
| 5,935,179 A | 8/1999 | Kleiner et al. |
| 5,940,928 A | 8/1999 | Erko |
| 5,942,869 A | 8/1999 | Katou et al. |
| 5,974,348 A | 10/1999 | Rocks |
| 6,038,501 A | 3/2000 | Kawakami |
| 6,055,042 A | 4/2000 | Sarangapani |
| 6,076,025 A | 6/2000 | Ueno et al. |
| 6,076,226 A | 6/2000 | Reed |
| 6,124,694 A | 9/2000 | Bancroft et al. |
| 6,226,830 B1 | 5/2001 | Hendriks et al. |
| 6,374,157 B1 | 4/2002 | Takamura |
| 6,459,955 B1 | 10/2002 | Bartsch et al. |
| 6,481,515 B1 | 11/2002 | Kirkpatrick et al. |
| 6,493,612 B1 | 12/2002 | Bisset et al. |
| 6,496,755 B2 | 12/2002 | Wallach et al. |
| 6,515,614 B2 * | 2/2003 | Sakai ................. G01S 15/931 180/167 |
| 6,574,536 B1 | 6/2003 | Kawagoe et al. |
| 6,594,844 B2 | 7/2003 | Jones |
| 6,605,156 B1 | 8/2003 | Clark et al. |
| 6,671,592 B1 | 12/2003 | Bisset et al. |
| 6,690,993 B2 | 2/2004 | Foulke et al. |
| 6,809,490 B2 | 10/2004 | Jones et al. |
| 6,830,120 B1 | 12/2004 | Yashima et al. |
| 6,836,701 B2 | 12/2004 | McKee |
| 6,841,963 B2 | 1/2005 | Song et al. |
| 6,883,201 B2 | 4/2005 | Jones et al. |
| 6,901,624 B2 | 6/2005 | Mori et al. |
| 6,971,140 B2 | 12/2005 | Kim |
| 7,085,624 B2 | 8/2006 | Aldred et al. |
| 7,155,308 B2 | 12/2006 | Jones |
| 7,173,391 B2 | 2/2007 | Jones et al. |
| 7,206,677 B2 | 4/2007 | Huldén |
| 7,388,343 B2 | 6/2008 | Jones et al. |
| 7,430,455 B2 | 9/2008 | Casey et al. |
| 7,441,298 B2 | 10/2008 | Svendsen et al. |
| 7,805,220 B2 * | 9/2010 | Taylor et al. ................. 700/253 |
| 2001/0004719 A1 | 6/2001 | Sommer |
| 2002/0075180 A1 | 6/2002 | Sakai et al. |
| 2002/0097400 A1 | 7/2002 | Jung et al. |
| 2003/0025472 A1 | 2/2003 | Jones et al. |
| 2003/0060928 A1 | 3/2003 | Abramson et al. |
| 2003/0229421 A1 | 12/2003 | Chmura et al. |
| 2004/0074038 A1 | 4/2004 | Im et al. |
| 2004/0117064 A1 | 6/2004 | McDonald |
| 2004/0133316 A1 | 7/2004 | Dean |
| 2004/0148731 A1 | 8/2004 | Damman et al. |
| 2004/0204804 A1 * | 10/2004 | Lee ...................... G05D 1/0219 701/23 |
| 2004/0504804 | 10/2004 | Lee et al. |
| 2004/0244138 A1 | 12/2004 | Taylor et al. |
| 2005/0000543 A1 | 1/2005 | Taylor et al. |
| 2005/0021181 A1 | 1/2005 | Kim et al. |
| 2005/0088642 A1 * | 4/2005 | Singh et al. ................. 356/5.01 |
| 2005/0165508 A1 * | 7/2005 | Kanda ................. G05D 1/0251 700/245 |
| 2005/0171644 A1 | 8/2005 | Tani |
| 2005/0192707 A1 | 9/2005 | Park et al. |
| 2005/0234610 A1 * | 10/2005 | Shimizu ............... G05D 1/0255 701/23 |
| 2005/0251292 A1 | 11/2005 | Casey et al. |
| 2005/0251457 A1 * | 11/2005 | Kashiwagi ..................... 705/26 |
| 2006/0190133 A1 | 8/2006 | Konandreas et al. |
| 2006/0229774 A1 * | 10/2006 | Park ..................... G05D 1/0238 701/23 |
| 2006/0241827 A1 | 10/2006 | Fukuchi et al. |
| 2007/0244610 A1 | 10/2007 | Ozick et al. |
| 2008/0058987 A1 * | 3/2008 | Ozick ...................... A47L 5/30 700/250 |
| 2008/0221729 A1 * | 9/2008 | Lavarec ........................ 700/245 |
| 2009/0048727 A1 | 2/2009 | Hong et al. |
| 2009/0055022 A1 | 2/2009 | Casey et al. |
| 2010/0037418 A1 * | 2/2010 | Hussey ..................... A47L 5/30 15/319 |
| 2011/0118928 A1 * | 5/2011 | Yoo ....................... A47L 9/2805 701/26 |

FOREIGN PATENT DOCUMENTS

| | | |
|---|---|---|
| CN | 102116625 | 7/2011 |
| DE | 10242257 | 4/2003 |
| EP | 0930040 A2 | 7/1999 |
| EP | 0861629 B1 | 9/2001 |
| GB | 2213047 A | 8/1989 |
| GB | 2404330 A | 2/2005 |
| JP | SHO 62-038911 A | 2/1987 |
| JP | S62-070916 | 4/1987 |
| JP | SHO 63-016309 A | 1/1988 |
| JP | HEI 01-106205 A | 4/1989 |
| JP | H05-023269 A | 2/1993 |
| JP | H07-175520 | 7/1995 |
| JP | HEI 07-253815 A | 10/1995 |
| JP | HEI 10-078823 A | 3/1998 |
| JP | 2002-366227 A | 12/2002 |
| JP | 2003-047579 A | 2/2003 |
| JP | 2003-180586 A | 7/2003 |
| JP | 2005-211360 A | 8/2005 |
| JP | 2005-230032 A | 9/2005 |
| JP | 2005-288655 A | 10/2005 |
| JP | 2006-006639 | 1/2006 |
| JP | 2006-018726 A | 1/2006 |
| JP | 2006-163558 A | 6/2006 |
| JP | 2007-303841 | 11/2007 |
| JP | 2009-037378 | 2/2009 |
| JP | 2009-169802 A | 7/2009 |
| JP | 2010-099365 A | 5/2010 |
| WO | WO0106904 A1 | 2/2001 |

(56) References Cited

FOREIGN PATENT DOCUMENTS

| WO | WO2004025947 A2 | 3/2004 |
| WO | 2004031878 A1 | 4/2004 |
| WO | WO2005083541 A1 | 9/2005 |

OTHER PUBLICATIONS

Kwon et al., "Table Recognition through Range-based Candidate Generation and Vision-based Candidate Evaluation," *ICAR, The 13th International Conference on Advanced Robotics Aug. 21-24, 2007*, Jeju, Korea, 918-923 (2007).

Terada et al., "An acquisition of the relation between vision and action using self-organizing map and reinforcement learning," IEEE, 1998, 6 pages.

Tse et al., "Design of a navigation system for a household mobile robot using neural networks," 1988, IEEE, vol. 3, pp. 2151-2156.

Li et al., "Making a local map of indoor environments by swiveling a camera and a sonar," IEEE, 1999, pp. 954-959.

Zha et al., "Mobile robot localization using incomplete maps for change detection in a dynamic environment," IEEE, 1997, p. 110.

Authorized Officer Simin Baharlou, International Preliminary Report on Patentability corresponding to international application No. PCT/US2011/068071 dated Jul. 2, 2013, 9 pages.

\* cited by examiner

COVERAGE ROBOT NAVIGATING

CLAIM OF PRIORITY

This U.S. patent application claims priority under 35 U.S.C. §119(e) to U.S. Provisional Application No. 61/428,793, filed Dec. 30, 2010, the disclosure of which is considered part of the disclosure of this application and is hereby incorporated by reference it its entirety.

TECHNICAL FIELD

This application relates to robots, and more particularly to autonomous coverage robots.

BACKGROUND

Autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted.

SUMMARY

An autonomous coverage robot will encounter many obstacles while operating. In order to continue operating, the robot will need to continually avoid obstacles and/or maneuver around obstacles.

In one aspect, a method of navigating an autonomous coverage robot on a floor includes controlling movement of the robot across the floor in a cleaning mode, receiving a sensor signal indicative of an obstacle, rotating the robot away from the sensed obstacle, determining a change in the received sensor signal during at least a portion of the rotation of the robot away from the sensed obstacle, and identifying the sensed obstacle based at least in part on the determined change in the received sensor signal.

Implementations of this aspect of the disclosure may include one or more of the following features. In some implementations, receiving the sensor signal indicative of an obstacle comprises determining an increase in the received sensor signal strength. For example, determining the increase in the received sensor signal strength can include low pass filtering the received sensor signal and comparing the low pass filtered sensor signal to an instantaneous sensor signal.

In some implementations, determining the change in the received sensor signal includes determining a peak in the strength of the received sensor signal. For example, determining the peak in the strength of the received sensor signal can include low pass filtering the received sensor signal and comparing the low pass filtered sensor signal to an instantaneous sensor signal.

In certain implementations, identifying the sensed obstacle based at least in part on the determined change in the received sensor signal includes storing a first robot heading associated with the received sensor signal indicative of the obstacle and storing a second robot heading associated with the determined peak in the received sensor signal. At least one of the first robot heading and the second robot heading can be determined by a gyroscope carried by the robot and/or by a wheel encoder of a wheel supporting at least a portion of the robot above the cleaning surface. Additionally or alternatively, identifying the sensed obstacle includes determining the angular width of the sensed obstacle based at least in part on the difference between the stored first and second robot headings and comparing the determined angular width of the sensed obstacle to a threshold. The threshold can be set based at least in part on the strength of the received sensor signal and/or the angular width of the obstacle.

In some implementations, the robot defines a fore-aft axis and the sensor signal indicative of the obstacle is received from one of a first sensor and a second sensor, the first sensor and the second sensor disposed on respective right and left sides of the fore-aft axis. In certain implementations, the method of navigating the autonomous coverage includes maneuvering the robot to orient the fore-aft axis substantially parallel to the sensed obstacle if the determined angular width of the obstacle is less than the threshold. For example, the robot can be positioned such that the sensor corresponding to the received sensor signal is closest to the sensed obstacle.

In certain implementations, upon determining that the angular width of the obstacle is less than the threshold, the robot is directed to turn toward the sensed obstacle. The robot can be substantially cylindrical and directing the robot to turn toward the sensed obstacle can include turning the robot with a radius slightly larger than the radius of the robot. For example, the robot can be directed to turn with a radius between about equal to the radius of the robot to about 1.8 times the radius of the robot. Additionally or alternatively, the robot can be directed to turn with a turn radius based at least in part on the determined angular width of the obstacle.

In certain implementations, directing the robot to turn toward the sensed obstacle includes directing the robot to turn until the first robot heading is reached and, upon reaching the first robot heading, directing the robot to move along a substantially straight path corresponding to the first robot heading.

In some implementations, upon determining that the angular width of the sensed obstacle is greater than or equal to the threshold, the robot is maneuvered to follow the sensed obstacle at a substantially fixed distance by changing a turning radius of the robot. Changing the turning radius of the robot can include turning the robot in a first direction away from the sensed obstacle and, upon determining that the sensor signal is no longer detected, turning the robot in a second direction toward the sensed obstacle.

In certain implementations, upon receiving a sensor signal indicative of an obstacle, the robot is moved along a substantially straight line, in a direction opposite the received sensor signal. For example, the robot is moved along the substantially straight line by a distance of about 15 mm to about 50 mm.

In some implementations, the speed of the coverage robot across the floor in a cleaning mode is reduced (e.g., reduced based at least in part on the received sensor signal indicative of the obstacle).

In another aspect, a mobile robot includes a chassis, a drive assembly coupled to the chassis to move the robot across a cleaning surface, a cleaning head arranged to remove debris from the floor over which the robot is driven, a first proximity sensor, and a controller in communication with the drive assembly to control movement of the robot across the cleaning surface. The chassis has a forward portion, a rear portion, and defines a fore-aft axis extending therebetween. The first proximity sensor is configured to generate a signal indicative of an object lateral to the robot as the robot moves across the cleaning surface. The controller is configured to receive the signal from the first proximity sensor, rotate the robot away from the sensed obstacle, and identify the sensed obstacle based at least in part on the determined change in the received sensor signal.

Implementations of this aspect of the disclosure may include one or more of the following features. In some implementations, a second proximity sensor is configured to generate a signal indicative of an object lateral to the robot as the robot moves across the cleaning surface, and the first and second proximity sensors are disposed on opposite sides of the fore-aft axis as the robot moves across the cleaning surface.

In certain implementations, the mobile robot includes a bumper carried on a forward portion of the chassis, wherein the first and second proximity sensors are disposed on the bumper. For example, the bumper can have a right-most edge and a left-most edge, with the first proximity sensor disposed toward the right-most edge of the bumper and the second proximity sensor disposed toward the left-most edge of the bumper. Additionally or alternatively, a third proximity sensor is disposed on the bumper between the first and second proximity sensors. The bumper can be movable relative to the chassis upon contact with an obstacle.

In some implementations, the first and second proximity sensors are each directed substantially parallel to the cleaning surface. Additionally or alternatively, the first and second proximity sensors are directed about 180 degrees relative to one another.

In certain implementations, the first proximity sensor includes at least one infrared emitter and receiver pair directed substantially parallel to the cleaning surface as the robot moves across the cleaning surface.

In still another aspect, a method of navigating an autonomous coverage robot on a floor includes directing the robot to move across the floor in a first behavior mode, monitoring movement of the robot on the floor during the first behavior mode, based at least in part on the monitored movement of the robot during the first behavior mode, determining whether the robot is confined, and upon determining that the robot is confined, initiating a second behavior mode.

Implementations of this aspect of the disclosure may include one or more of the following features. In some implementations, the first behavior mode includes one or more of the following behavior modes: a bounce mode, an obstacle following mode, and a spot coverage mode. Directing the robot to move across the floor in the first behavior mode comprises sending an activation command to a motor carried by the robot, the motor arranged to power a wheel for moving the robot across the floor. In certain implementations, the second behavior mode can be selected from one or more of the following behavior modes: a bump following mode, a wall-following mode, and an escape mode.

In some implementations, monitoring the movement of the robot on the floor includes determining a plurality of positions of the robot on the floor over a period of time. For example, determining a plurality of positions of the robot on the floor over a period of time can include receiving a signal from a gyroscope carried by the robot and/or receiving a signal from a wheel encoder arranged to monitor movement of the wheel.

In certain implementations, determining that the robot is confined includes determining that the heading of the robot has changed by about 360 degrees or more and the linear movement of the robot is less than about 6 meters.

In still another aspect, a method of generating a local area map of a cleaning surface includes controlling movement of an autonomous coverage robot across the floor in a cleaning mode, receiving a sensor signal indicative of a first obstacle, upon receiving the sensor signal indicative of the first obstacle, moving the robot in a direction away from the sensed first obstacle, receiving a sensor signal indicative of a second obstacle, upon receiving the sensor signal indicative of the second obstacle, determining a relative position of the first obstacle to the second obstacle. Controlling movement of the autonomous coverage robot is based at least in part on the determined relative position of the first obstacle to the second obstacle.

Implementations of this aspect of the disclosure may include one or more of the following features. In some implementations, controlling movement of the autonomous coverage robot includes moving the autonomous coverage robot in a direction away from the first and second obstacles if the relative position of the first obstacle to the second obstacle is less than a threshold distance. For example, the threshold distance can be about equal to a largest dimension of the autonomous coverage robot parallel to the cleaning surface (e.g., the diameter of a substantially cylindrical robot that is substantially circular as viewed from the top down as the robot moves across the cleaning surface).

In certain implementations, a heading of the robot is determined upon receiving the sensor signal indicative of the first obstacle.

In some implementations, controlling movement of the autonomous coverage robot includes biasing movement of the robot toward the sensed heading as the robot moves relative to the first and/or second obstacle.

In certain implementations, determining a relative position of the first obstacle to the second obstacle includes dead reckoning from the first sensed obstacle to the second sensed obstacle. The dead reckoning can be based at least in part upon a heading received from a gyroscope disposed on the robot. Additionally or alternatively, the dead reckoning can be based at least in part upon measuring rotation of a wheel of the autonomous coverage robot as the autonomous coverage robot moves across the surface. For example, measuring rotation of the wheel can include receiving a signal from a wheel encoder.

In some implementations, controlling movement of the autonomous coverage robot includes moving the autonomous coverage robot to avoid the first and second obstacles. For example, moving the autonomous coverage robot to avoid the first and second obstacles can include moving the autonomous coverage robot in a direction away from the first and second obstacles.

In certain implementations, the determined relative orientation of the first obstacle to the second obstacle is stored (e.g., in a memory).

In yet another aspect, a method of navigating an autonomous coverage robot on a floor includes storing a heading of the autonomous coverage robot, moving the autonomous coverage robot along the stored heading to an obstacle tangent to a turning circle of the autonomous coverage robot, scanning a sensor carried on the autonomous coverage robot, receiving the scanned sensor signals, classifying the obstacle based at least in part on the received scanned sensor signals, orbiting the autonomous coverage robot around at least a portion of the classified obstacle based at least in part on classification of the obstacle as a post, comparing the stored heading to the heading of the autonomous coverage robot during orbiting of the classified obstacle, and resuming the stored heading based at least in part on the comparison of the stored heading to the heading of the autonomous coverage robot during orbiting.

In some implementations, resuming the stored heading includes interrupting the orbit of the autonomous coverage robot if the heading of the autonomous coverage robot during orbiting equals the stored heading.

In certain implementations, resuming the stored heading includes turning the autonomous coverage robot toward the stored heading. In some examples, turning the autonomous coverage robot toward the stored heading can include turning the autonomous coverage robot in a direction opposite the direction of orbit of the autonomous coverage robot. For example, the autonomous coverage robot can orbit the classified obstacle until the difference between the stored heading and the heading of the autonomous coverage robot during the orbiting is a fixed value (e.g., ±45 degrees) and turning the autonomous coverage robot toward the stored heading can include turning the autonomous coverage robot in a direction opposite the direction of orbit until the heading of the autonomous coverage robot matches the stored heading of the autonomous coverage robot.

In some implementations, orbiting the autonomous coverage robot includes moving the autonomous coverage robot with a radius greater than a turning perimeter of the autonomous coverage robot.

In certain implementations, classifying the obstacle based at least in part on the received scanned sensor signals includes comparing the scanned sensor signals to an empirical model.

In some implementations, scanning the sensor carried on the autonomous coverage robot includes turning the autonomous coverage robot to move the sensor. Additionally or alternatively, scanning the sensor carried on the autonomous coverage robot can include moving the sensor relative to the autonomous coverage robot.

In certain implementations, the sensor comprises one or more of the following: a camera, a laser, and a proximity sensor.

DESCRIPTION OF DRAWINGS

Like reference symbols in the various drawings indicate like elements.

DETAILED DESCRIPTION

Figure 1:
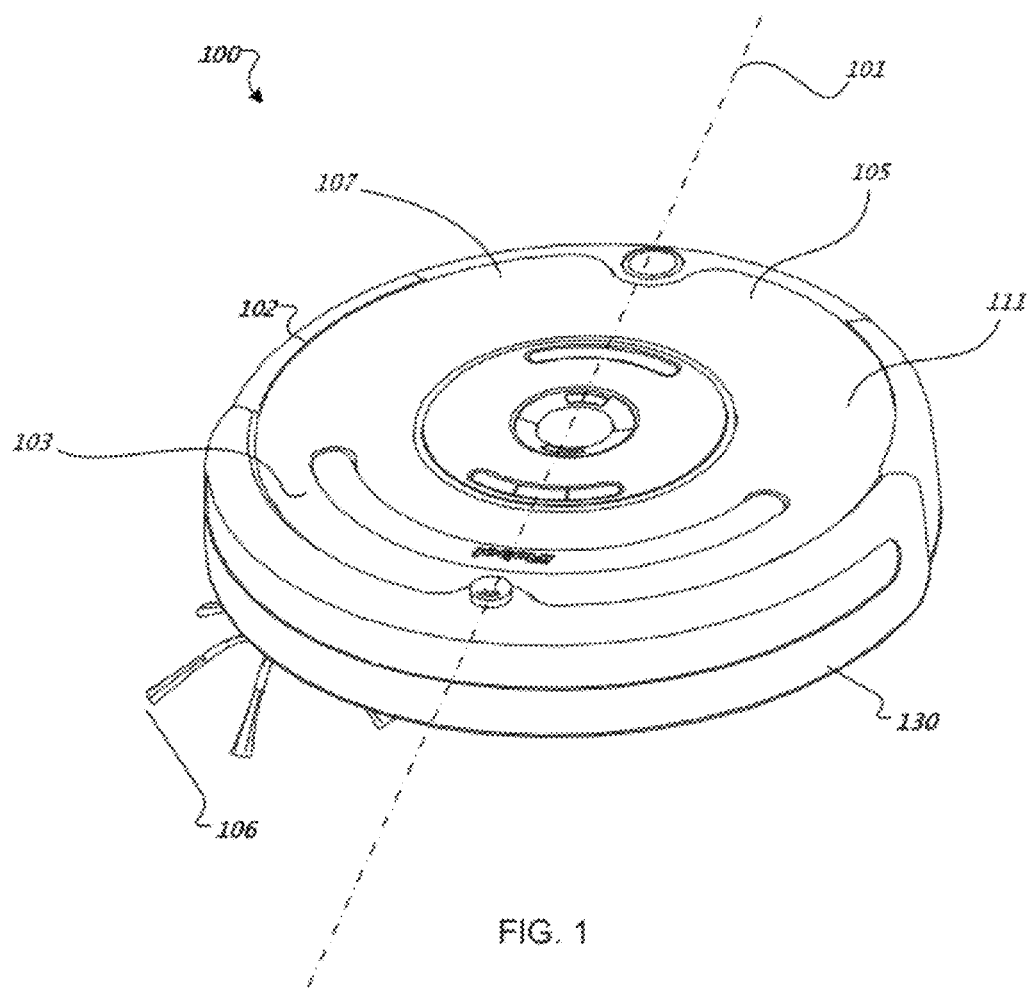
FIG. 1 shows an above-perspective view of an example autonomous coverage robot.
Figure 2:
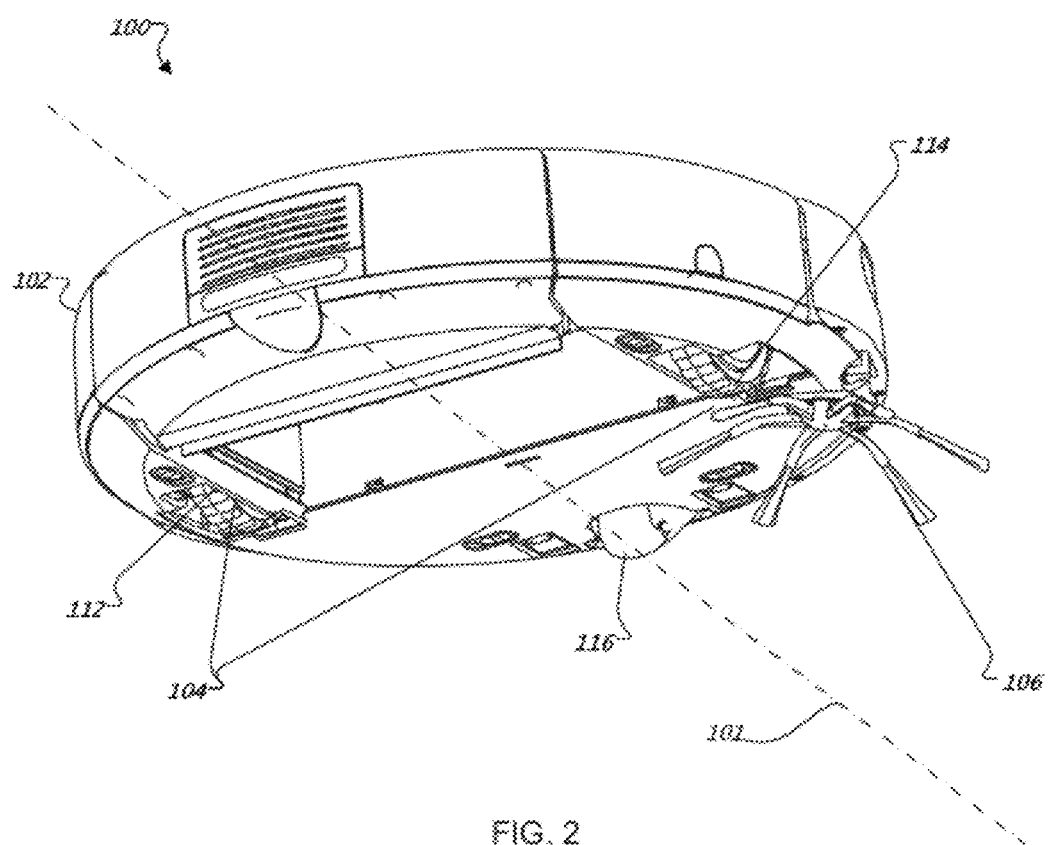
FIG. 2 shows a below-perspective view of the example autonomous coverage robot of FIG. 1.
Figure 3:
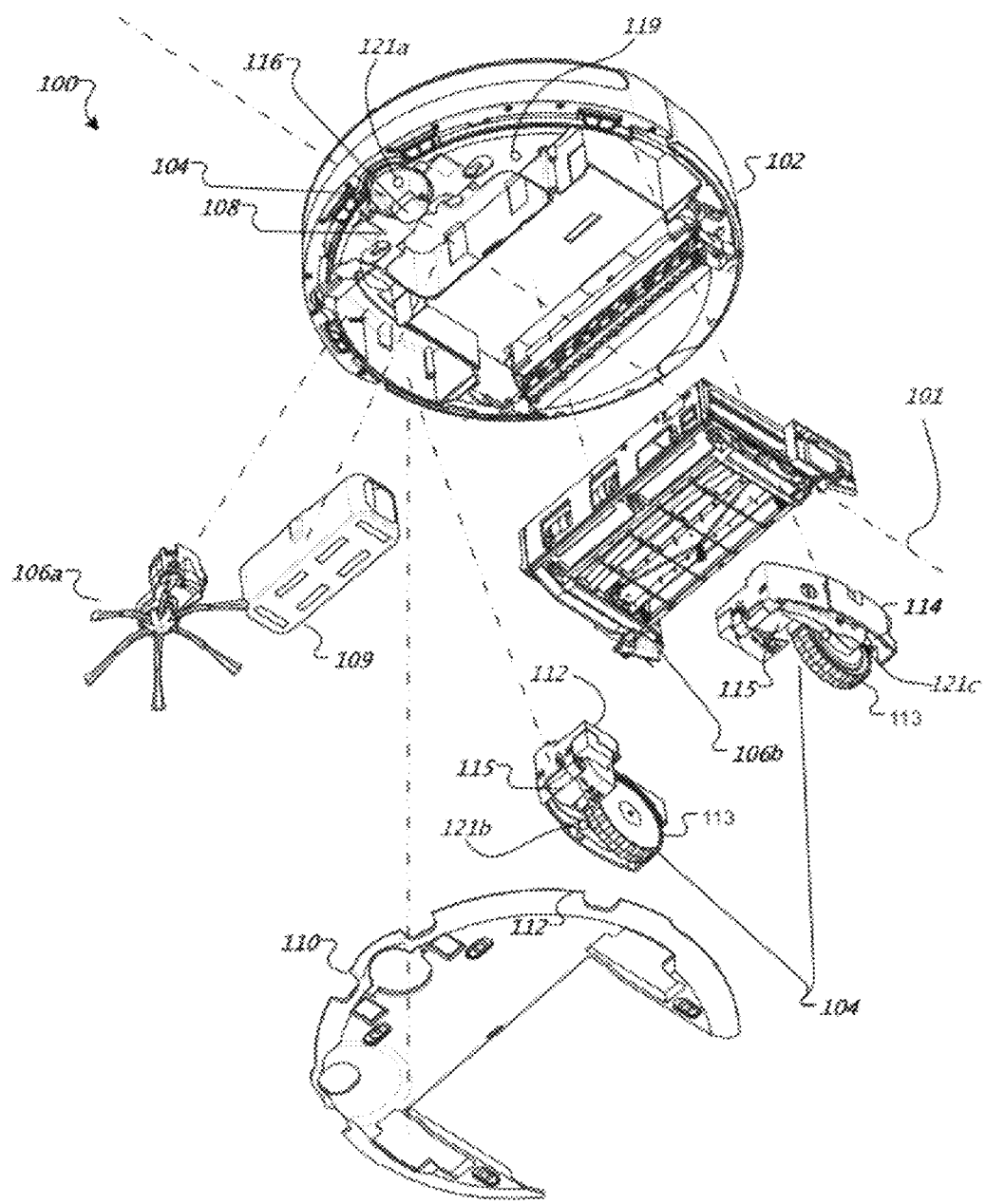
FIG. 3 shows an exploded view of the example autonomous coverage robot of FIG. 1.

FIGS. 1-3 show above-perspective, below-perspective, and exploded views of an example autonomous coverage robot 100. Robot 100 includes a chassis 102, a drive system 104, a main cleaning head 106*b*, and a controller 108. In some implementations, robot 100 includes an edge cleaning head 106*a*. During use, controller 108 provides commands to drive system 104, main cleaning head 106*b*, and edge cleaning head 106*a* to move the robot 100 over a cleaning surface (e.g., a floor) to remove debris from the cleaning surface.

Referring to FIG. 1, chassis 102 includes a forward portion 103, a rear portion 105, and defines a fore-aft axis 101 therebetween. When the robot is placed on the cleaning surface, fore-aft axis 101 is substantially parallel to the cleaning surface. Fore-aft axis 101 divides chassis 102 into a right portion 107 and a left portion 111.

Referring again to FIGS. 1-3, drive system 104 is mounted on chassis 102, and is a differential drive (left and right wheels near to or on the center diameter of the robot and independently speed controllable) configured to maneuver robot 100. Edge cleaning head 106*a* can be mounted to extend past the side edge of chassis 102 for removing dirt and debris below and immediately adjacent to robot 100, and more particularly to sweep dirt and debris into the cleaning path of main cleaning head 106*b* as the robot cleans in a forward direction. In some implementations, main or edge cleaning heads 106*b*, 106*a* may also be used to apply surface treatments (e.g., water and/or detergent). Controller 108 (also depicted in FIG. 5A) is carried by chassis 102 and is controlled by behavior based robotics to provide commands to the components of robot 100 based on sensor readings or directives, as described below, to navigate around obstacles, clean, and/or treat floors in an autonomous fashion. A battery 109 may provide a source of power for robot 100 and its subsystems. A bottom cover 110 may protect internal portions of robot 100 and keep out dust and debris.

Drive system 104 includes a right drive wheel assembly 112 and a left drive wheel assembly 114. Each drive wheel assembly 112, 114 includes a wheel 113 and a motor 115 coupled to the wheel 113 to drive the wheel 113. Drive wheel assemblies 112, 114 are connected to chassis 102 and support at least a portion of the chassis 102 above a cleaning surface. In certain implementations, main cleaning assembly 106b and/or edge cleaning head 106a support at least a portion of the of the chassis 102 above the cleaning surface. Additionally or alternatively, robot 100 can include a castor wheel assembly 116 supporting at least a portion of the robot 100 above the cleaning surface.

Controller 108 may provide commands to drive system to drive wheel assemblies 112 and 114 forward or backwards to maneuver robot 100. For instance, a command may be issued by controller 108 to engage both wheel assemblies 112, 114 in a forward direction, resulting in forward motion of robot 100. In another instance, a command may be issued for a left turn that causes left wheel assembly 114 to be engaged in the forward direction while right wheel assembly 112 is driven in the rear direction, resulting in robot 100 making a clockwise turn when viewed from above. In yet another instance, an analogous command may be issued for a right turn that results in robot 100 making a counterclockwise turn when viewed from above. As described in further detail below, controller 108 may combine the forward, reverse, right, and/or left commands to the wheel assemblies to circumnavigate robot 100 around one or more obstacles encountered as robot 100 moves across a cleaning surface.

Figure 4A:
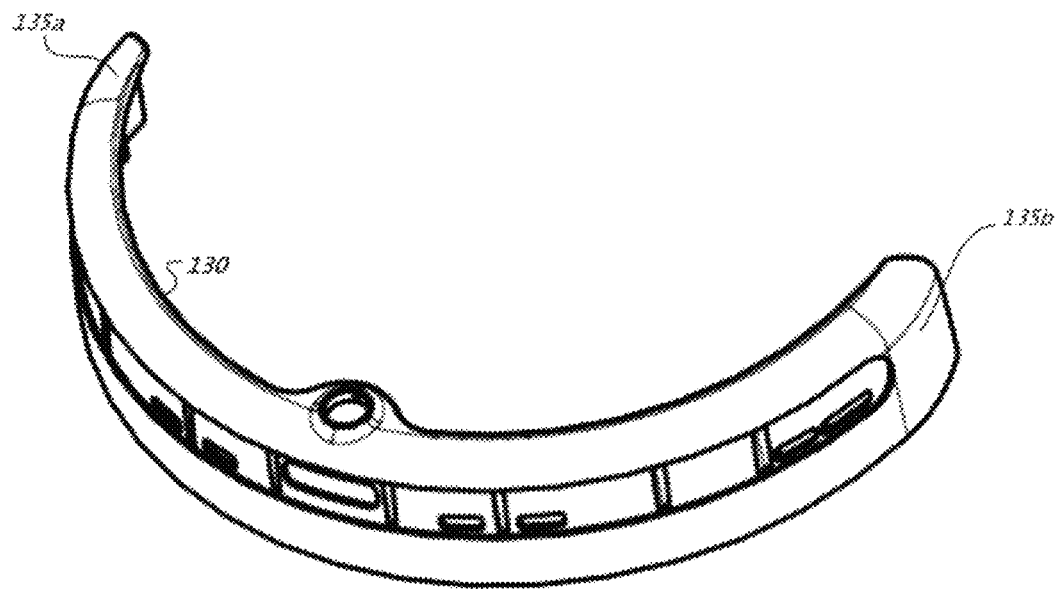
FIG. 4A shows a bumper of the example autonomous coverage robot of FIG. 1.
Figure 4B:
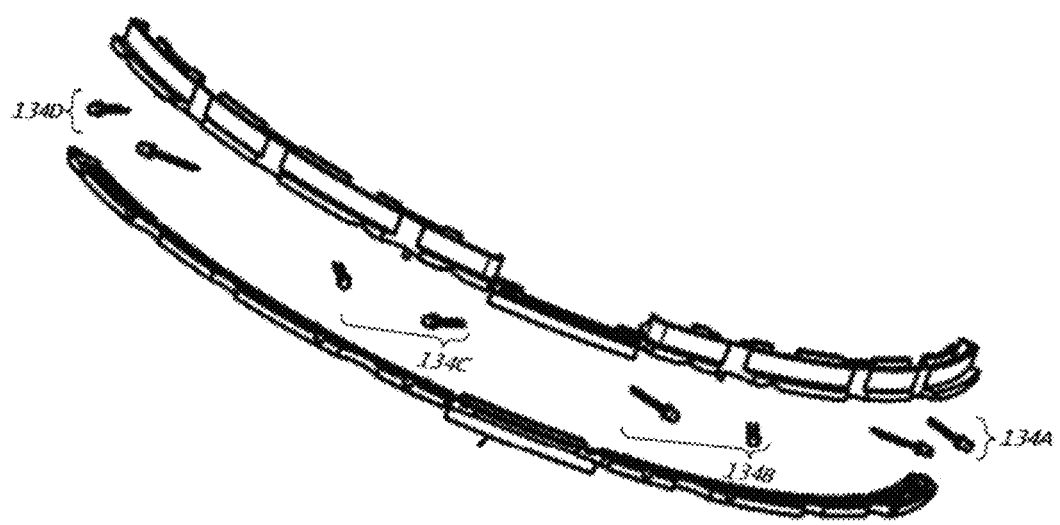
FIG. 4B shows proximity sensors of the example autonomous coverage robot of FIG. 1.

Referring to FIGS. 4A-B, a bumper 130 may be used with robot 100. Proximity sensors 134A-D are housed within bumper 130 and directed substantially parallel to the cleaning surface to sense a potential obstacle lateral to the robot (e.g., in front of the robot as the robot moves in a forward path of travel along the cleaning surface). For example, proximity sensors 134A-D may be oriented to sense a potential obstacle about 1 inch to about ten inches lateral to (e.g., in front of) robot 100. In some implementations, each proximity sensor 134A-D includes an infrared emitter detector pair that should go off (i.e., when a receiver receives a reflection originating in the overlapping space of an emitter and receiver angled toward one another) from about 1 to 10 inches (preferably, from 1 to 4 inches). Such a proximity detector including an infrared emitter/detector pair is disclosed in U.S. Pat. No. 7,441,298, entitled "Coverage Robot Mobility," the entire content of which is incorporated herein by reference in its entirety.

At least two of proximity sensors (e.g., proximity sensors 134A and 134D) are disposed along respective end portions 135a,b of bumper 130 (e.g., along the right-most and left-most portions of bumper 130) such that the proximity sensors 134A and 134D are directed about 180 degrees relative to one another. In this orientation, proximity sensors 134A and 134D span the width of robot 100 as the robot moves along the fore-aft axis 101. Such positioning of proximity sensors 134A and 134D reduces the "blind spot" of the robot 100 by, for example, reducing the likelihood that robot 100 will not detect an obstacle in its path as it moves in a forward direction of travel.

Figure 5:
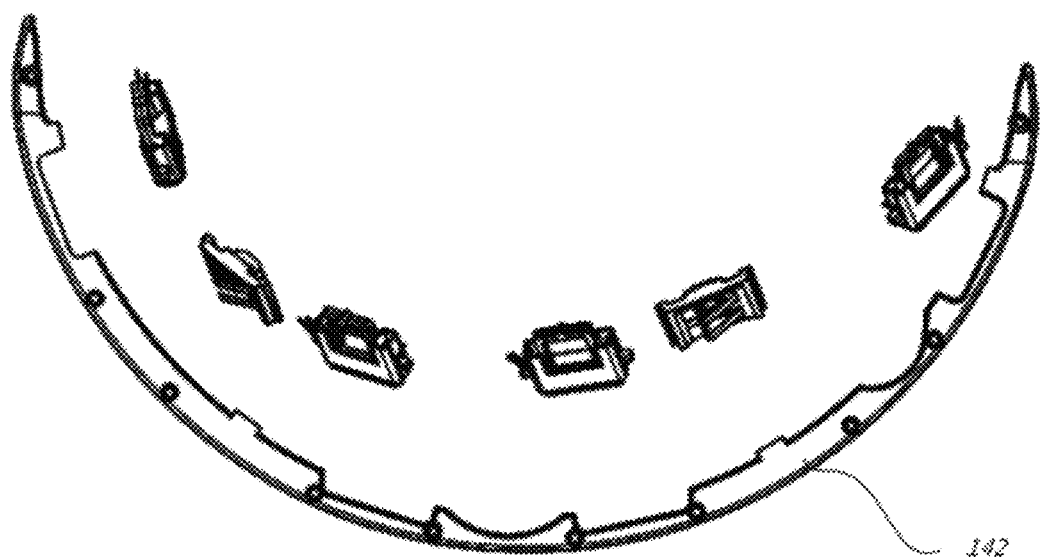
FIG. 5 shows floor proximity sensors, kinetic bump sensors, and an attachment brace of the example autonomous coverage robot of FIG. 1.

Referring to FIG. 5, an attachment brace 142 may be used to support kinetic bump sensors 132 and floor proximity sensors 140 on robot 100. Kinetic bump sensors 132 may sense collisions between robot 100 and objects in the robot's forward path. Floor proximity sensors may be carried by chassis 102 and be used to sense when robot 100 is near a "cliff", such as a set of stairs. Floor proximity sensors 140 may send signals to controller 108 indicating whether or not a cliff is detected. Based on signals from the floor proximity sensors 140, controller 108 may direct drive system 104 to change speed or velocity to avoid the cliff.

Bumper 130 may be movably supported on the forward portion 103 of chassis 102 such that at least a portion of bumper 130 moves a short distance toward chassis 102 upon contact with an obstacle. Movement of the bumper 130 can allow the bumper to contact one or more kinetic bump sensors 132 to produce a signal indicative of a bumped object.

Figure 6A:
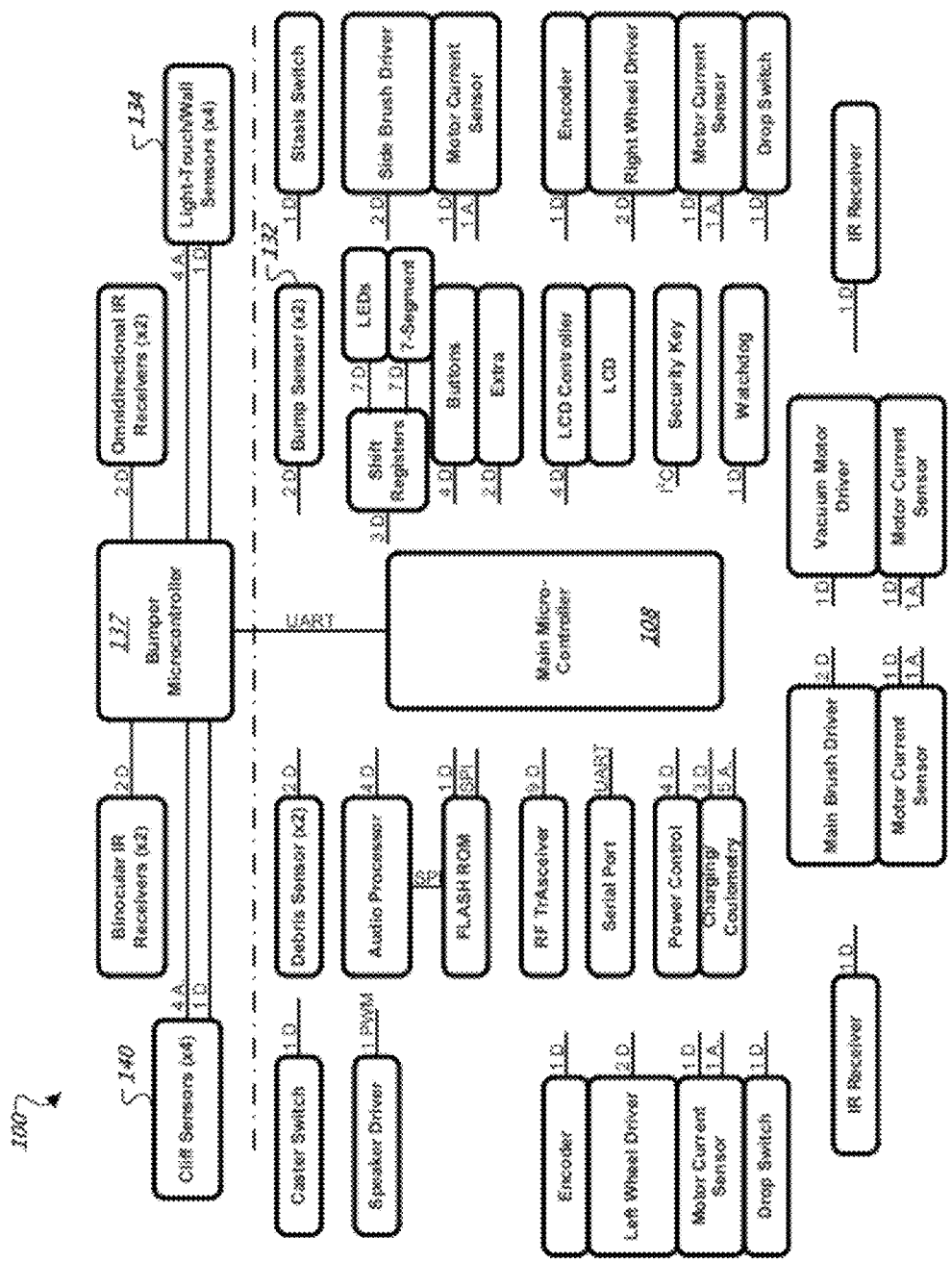
FIG. 6A shows a block diagram of an example autonomous coverage robot.

Referring to FIG. 6A, electronics of the robot 100 include the controller 108 which communicates with a bumper micro-controller 137. Together, the controller 108 and the bumper micro-controller 137 control an omni-directional receiver, directional receiver, wall proximity sensors 134A-D, and kinetic bumper switches 132. The controller 108 monitors all other sensor inputs including, for example, cliff sensors and motor current sensors for each drive wheel assembly 112, 114.

Control of the direction and speed of the robot 100 may be handled by motion control behaviors selected by an arbiter according to the principles of behavior based robotics for coverage and confinement, generally disclosed in U.S. Pat. Nos. 6,809,490 and 6,781,338, herein incorporated by reference in their entireties (and executed by controller 108), to reduce the speed magnitude of robot 100 when proximity sensor 134 detects a potential obstacle. The motion control behaviors directed by the controller 108 may also alter the velocity of robot 100 when kinetic bump sensors 132 detect a collision of robot 100 with an obstacle.

Figure 6B:
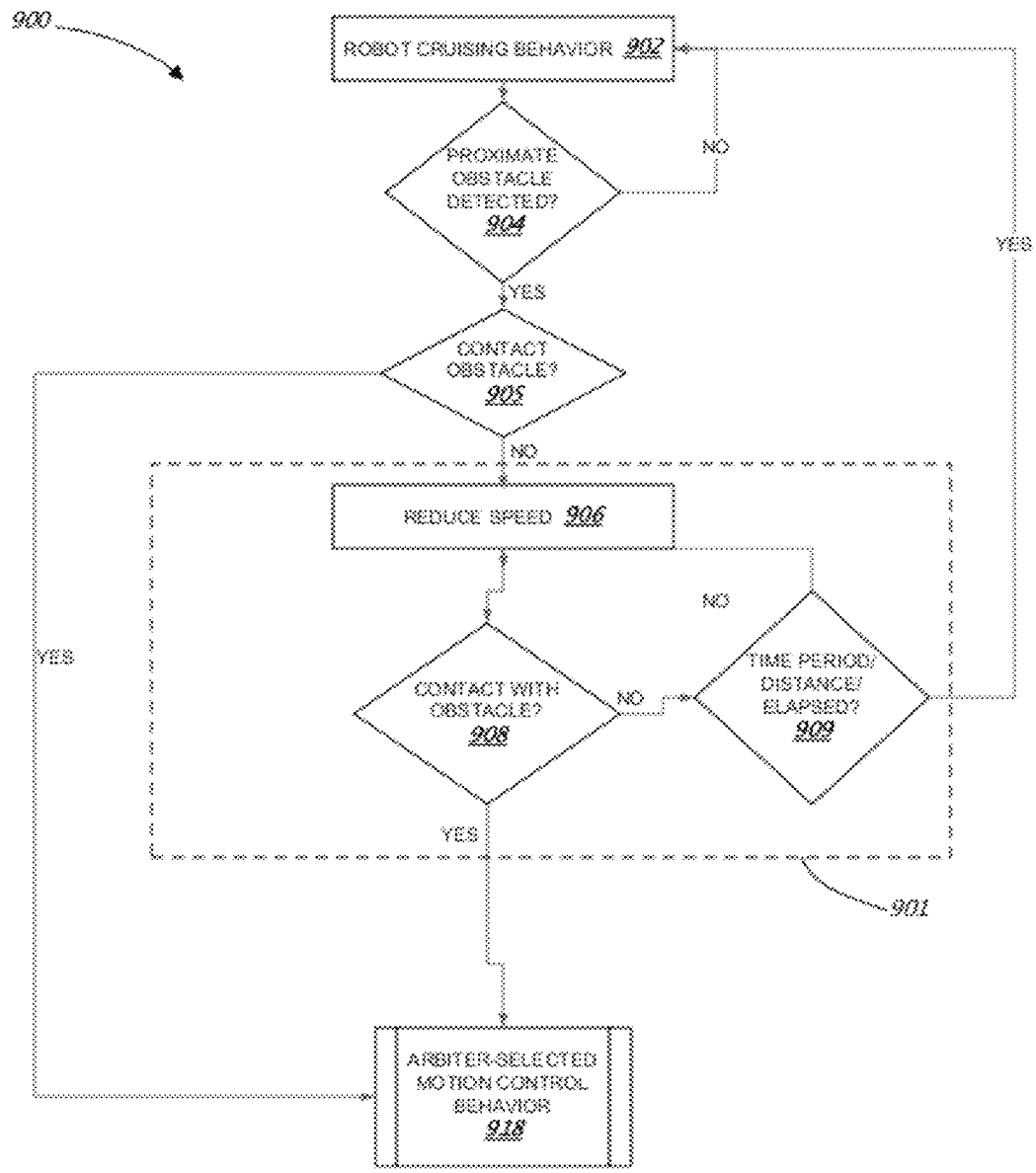
FIG. 6B shows a flow chart of motion control of an example autonomous coverage robot.

For example, referring to FIG. 6B, motion control 900 of the controller 108 includes directing robot 100 to traverse 902 a cleaning surface in a coverage mode. For example, the controller may direct the robot 100 to traverse 902 the cleaning surface in one or more of the following coverage modes: SPOT COVERAGE; RANDOM; and STRAIGHT. These coverage modes are described in U.S. Pat. No. 6,809,490, entitled "Method and System for Multi-Mode Coverage for an Autonomous Robot," the entire contents of which are incorporated herein by reference.

Controller 108 detects 904 a proximate obstacle by receiving a signal from one or more of proximity sensors 134A-D and/or from one or more of the kinetic bump sensors 132. The controller 108 determines the approximate orientation of robot 100 relative to the detected 904 obstacle based at least in part on the sensors 134A-D, 132 that generate signals indicative of the obstacle. For example, received signals from sensor 134D disposed to the right of fore-aft axis 101 is indicative of an obstacle to the right of robot 100.

The controller 108 determines 905 whether robot 100 is contacting the obstacle. The determination 905 can be based at least in part on whether the controller receives a signal from proximity sensors 134A-D and/or from the kinetic bump sensor 132. For example, if the controller 108 receives only a signal from one of the proximity sensors 134A-D but not from kinetic bump sensor 132, the controller 108 determines 905 that the robot 100 is proximate to, but not yet contacting, the obstacle. As another example, if the controller 108 receives a signal from the kinetic bump sensor 132 (e.g., alone or in combination with the proximity sensors 134A-D), the controller 108 determines 905 that the robot is proximate to and contacting the obstacle.

When controller 108 determines 905 a proximate, but not yet contacting, obstacle (e.g., via proximity sensors 134A-D), controller 108 executes a gentle touch routine 901 (which may be a behavior, a part of a behavior, or formed by more than one behavior). The controller 108 reduces 906 the speed of robot 100 such that robot 100 does not proceed at full cleaning speed into the sensed obstacle. In some implementations, the speed of robot 100 is reduced 906 by decreasing the amount of power provided to the drive wheel assemblies 112, 114. For example, the controller 108 reduces 906 the approach speed of the robot from a full cleaning speed of about 300 mm/sec to a reduced cleaning speed of about 100 mm/sec. Such a reduction in cleaning speed can reduce the overall noise, the potential damage to robot 100, and/or the potential damage to the sensed obstacle.

When controller 108 detects 905 contact with the obstacle at full speed via kinetic bump sensors 132 or when controller 108 detects 908 contact with the obstacle at reduced speed via kinetic bump sensors 1032, controller 108 may execute one or more arbiter-selected motion control behaviors 918. Examples of arbiter-selected motion control behaviors 918 are disclosed in U.S. Pat. No. 6,809,490, entitled "Method and System for Multi-Mode Coverage for an Autonomous Robot," and U.S. Pat. No. 7,441,298, entitled "Coverage Robot Mobility," the entire contents of which are incorporated herein by reference in their entireties. Additionally or alternatively, the arbiter-selected motion control behavior 918 includes clutter navigation, as described below.

Clutter navigation includes one or more behaviors that react to aspects of an environment to maneuver robot 100 efficiently through the environment (e.g., through obstacles disposed along the environment). For example, clutter navigation can reduce, on average, cycle-to-cycle variation and single n-pass coverage variation. Additionally or alternatively, clutter navigation can reduce the number of high impact collisions that could otherwise occur as robot 100 moves through cluttered areas.

Figure 6C:
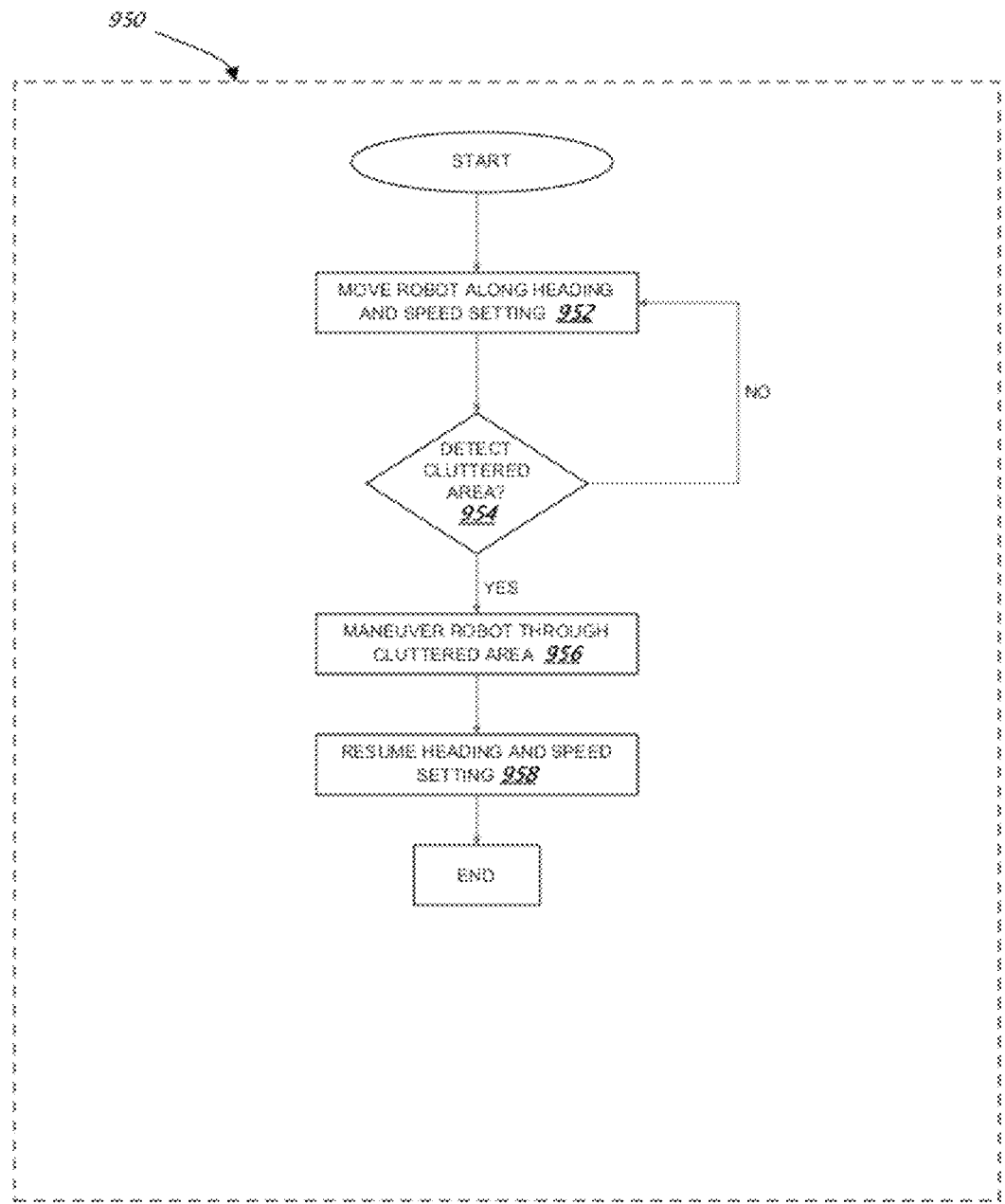
FIG. 6C shows a flow chart of clutter navigation of an example autonomous coverage robot.
Figure 7:
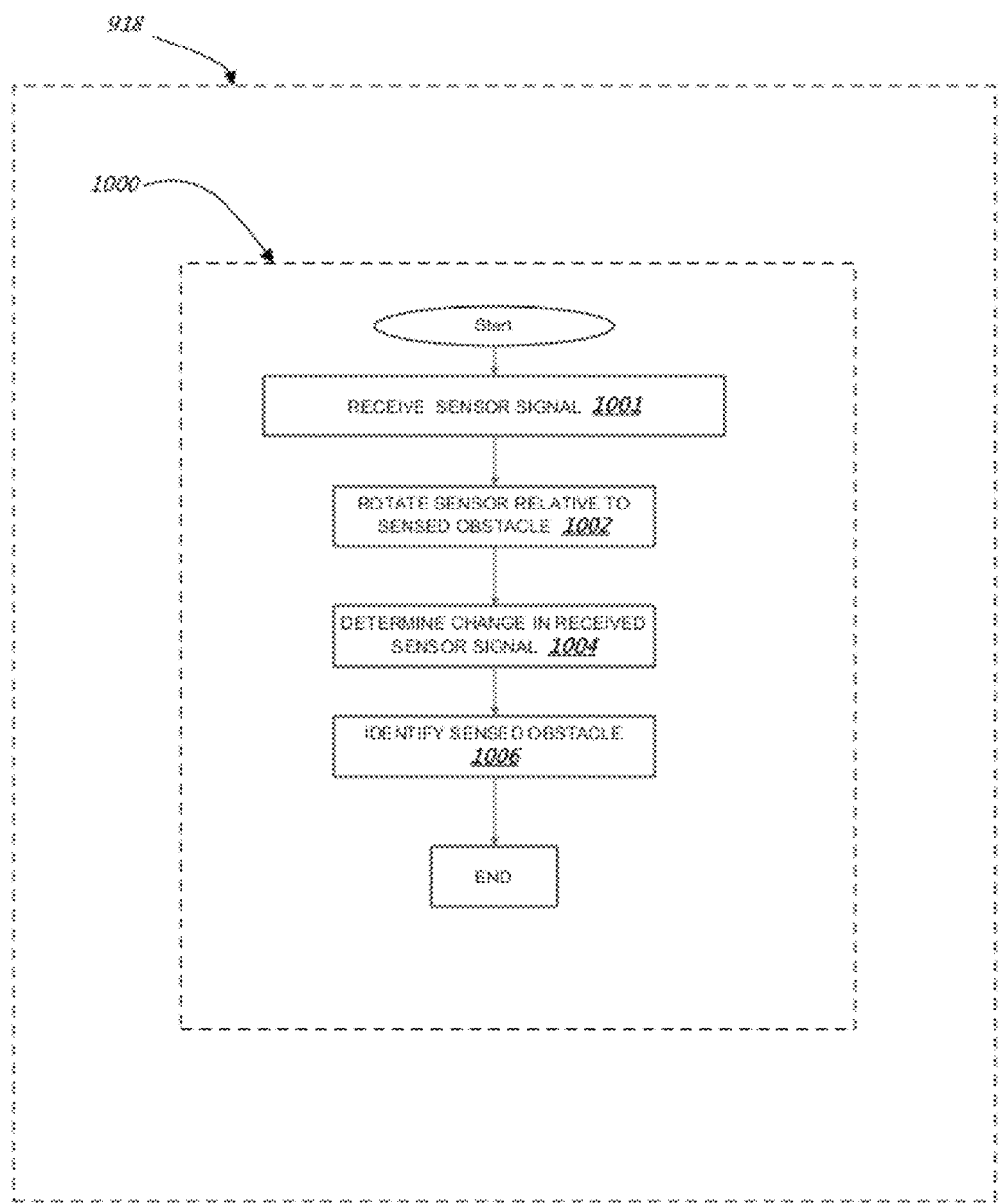
FIG. 7 shows a flow chart of obstacle classification as an arbiter-selected motion control behavior of an example autonomous coverage robot.

Referring to FIG. 6C, in one example, clutter navigation 950 includes moving 952 robot 100 along a heading and speed setting, detecting 954 a cluttered area, maneuvering 956 robot 100 through the cluttered area, and resuming 958 the heading and speed setting. Resuming 958 the heading and speed setting of robot 100 can include returning to the heading and speed setting, for example, if an obstacle has not been detected 954 for a period of time (e.g., a fixed period of time).

Moving 952 robot 100 along the heading and speed setting can be carried out as part of a cleaning mode or as part of another arbiter-selected motion control behavior. The heading of robot 100 can be controlled by comparing the heading setting to the actual heading measured by one or more of the wheel encoders 121a, 121b, 121c and/or by the gyroscope 119 (see FIG. 3) and, based at least on this comparison, adjusting movement of one or more of drive wheel assemblies 112 and 114. The speed of robot 100 can be controlled by comparing the speed setting to the actual speed measured, for example, by one or more wheel encoders 121a, 121b, 121c.

Detecting 954 the cluttered area can include receiving a signal from one or more triggers such as, for example, detected contact with an obstacle (see FIG. 6B). In some implementations, detecting 954 the cluttered area includes optical detection (e.g., by proximity sensors 134A-D in FIG. 4B) of an obstacle.

Maneuvering 956 robot 100 through the cluttered area can include reducing the speed setting of robot 100 (e.g., from about 300 mm/s to about 100 mm/s). Additionally or alternatively, maneuvering 956 robot 100 through the cluttered area can include moving robot 100 around detected obstacles while biasing movement of robot 100 toward the heading setting. In certain implementations, robot 100 maneuvers 956 through the cluttered area only after a fixed period after startup (e.g., after about 10 seconds to about one minute after startup). Additionally or alternatively, robot 100 maneuvers 956 through the cluttered area only before a fixed period after startup such that, for example, robot 100 will not attempt to maneuver 956 through the cluttered area if robot 100 is near the end of a cleaning cycle. In some implementations, robot 100 will not attempt to maneuver 956 through the cluttered area if the state-of-charge of battery 109 (shown in FIG. 3) is above a threshold.

Maneuvering 956 robot 100 may, in some instances, include directing robot 100 to move around the obstacle in response to detection of the obstacle (e.g., in response to contact with the obstacle). For example, robot 100 may move in a somewhat semi-circular path around the object, or a succession of alternating partial spirals (e.g., arcs with progressively decreasing radius). In another instance, robot 100 may move away from the object and then move in a direction that is somewhat tangential to the object. Additionally or alternatively, as described in further detail below, maneuvering 956 may include classification of the obstacle based at least in part upon signals received by controller 108 from one or more sensors carried on robot 100 (e.g., signals from one or more proximity sensors 134A-D) and maneuvering robot 100 based at least in part on the classification.

Referring to FIGS. 6A, 6B, 6C and 7, arbiter-selected motion control behavior 918 can include obstacle classification 1000 (e.g., as part of clutter navigation 950) such that, during use, controller 108 moves 902 robot 100 across the floor in a cleaning mode, detects 908 contact with the obstacle and, based at least in part on the detected 908 contact with the obstacle, initiates an arbiter-selected motion control behavior 918, which can include obstacle classification 1000. The contact with the obstacle is detected 908 by kinetic bump sensor 132. As described below, the obstacle classification 1000 is based at least in part on the proximity sensors 134A and/or 134D.

Obstacle classification 1000 includes receiving 1001 a sensor signal indicating proximity of an obstacle, rotating 1002 the sensor (e.g. by rotating robot 100 and/or by rotating the sensor) relative to the received sensor signal indicative of the proximate obstacle, determining 1004 a change in the received sensor signal during at least a portion of the rotation of robot 100, and identifying 1006 the sensed obstacle based at least in part on the determined change in the received sensor signal. As described below, obstacle classification 1000 can determine, for example, whether the sensed obstacle is a post or a wall (or a wall-like structure). In some implementations, such a determination facilitates efficient movement of robot 100 through a cluttered area by, for example, allowing controller 108 to determine the potential effectiveness of moving robot 100 through one or more circumnavigation behaviors to maintain substantially a heading setting of robot 100 through the cluttered area.

Receiving 1001 a sensor signal indicative of an obstacle includes receiving a signal from the one or more proximity sensors 134A-D (see FIG. 4B). However, in some implementations, the robot 100 is moved away from the contact 908 signal (representative of the obstacle) before receiving 1001 the signal from the proximity sensors 134A-D. Moving robot 100 away from contact 908 can improve the signal strength received by proximity sensors 134A-D. For example, based at least upon receiving contact 908 signal, robot 100 can be initially moved away from the detected obstacle by a distance of about 15 mm to about 50 mm (e.g., 38 mm). In some instances, robot 100 is moved in a reverse direction by a distance that is less than half of a fore-aft dimension of robot 100. Such a ratio between the reverse movement of robot 100 and a fore-aft dimension of robot 100 can reduce the likelihood that robot 100 will encounter an obstacle and/or cliff as it moves in the reverse direction.

In certain implementations, robot 100 is moved in a reverse direction away from the contact 908 signal until the received 1001 sensor signal from the one or more proximity sensors 134A-D is above a threshold. Additionally or alternatively, robot 100 is moved generally away (e.g., generally backwards with corrections in a forward direction) from the contact 908 signal until the strength of the received 1001 sensor signal from the one or more proximity sensors 134A-D is about at a maximum value.

Rotation 1002 of the sensor can include rotating robot 100 away from the received 1001 sensor signal from one or more proximity sensors 134A-D and, thus, can be in either a clockwise or counterclockwise direction. For example, if the received 1001 signal corresponds to the proximity sensor 134A disposed toward the left of robot 100 (e.g., to the left of fore-aft axis shown in 130), rotation 1002 can be in the clockwise direction. Robot 100 can move in an analogous counterclockwise direction in response to receiving 1001 a signal from the proximity sensor 134D disposed toward the right of robot 100 (e.g., to the right of fore-aft axis 101 shown in FIGS. 1-2). In some implementations, the clockwise or counterclockwise rotation 1002 is achieved by directing drive system 104 (in FIGS. 2-3) to rotate robot 100 in place as described above. In certain implementations, rotation 1002 is part of another behavior such as, for example, an escape behavior, an obstacle avoidance behavior, and/or a cleaning behavior.

Determining 1004 a change in the received 1001 sensor signal during at least a portion of the rotation of robot 100 can include determining an increase in the received 1001 sensor signal from one of proximity sensors 134A-D. Additionally or alternatively, determining 1004 a change in the received 1001 sensor signal during at least a portion of the rotation of the robot 100 can include determining a peak in the strength of the received sensor signal.

In some implementations, determining 1004 a change in the received 1001 sensor signal includes comparing a substantially instantaneous value of the received 1001 sensor signal to a processed (e.g., low-pass filtered) value of the received 1001 sensor signal. Such a comparison of an instantaneous signal to a processed signal can reduce the likelihood of false-positive determinations (e.g., of an increase or of a peak value) resulting from noisy or otherwise highly variable sensor signals.

Identifying 1006 the sensed obstacle includes classifying the obstacle based at least in part on the determined 1004 change in the received sensor signal. In some implementations, the determined 1004 change in the received sensor signal can be representative of an angular width of the obstacle in a direction facing robot 100. For example, if the determined 1004 change in the received sensor signal is representative of an angular width less than a threshold value (e.g., less than about Additionally or alternatively, in certain implementations described in further detail below, the identification 1006 can be based at least in part on an increase in the received 1001 sensor signal and on the determined peak in the received 1001 sensor signal.

Figure 8:
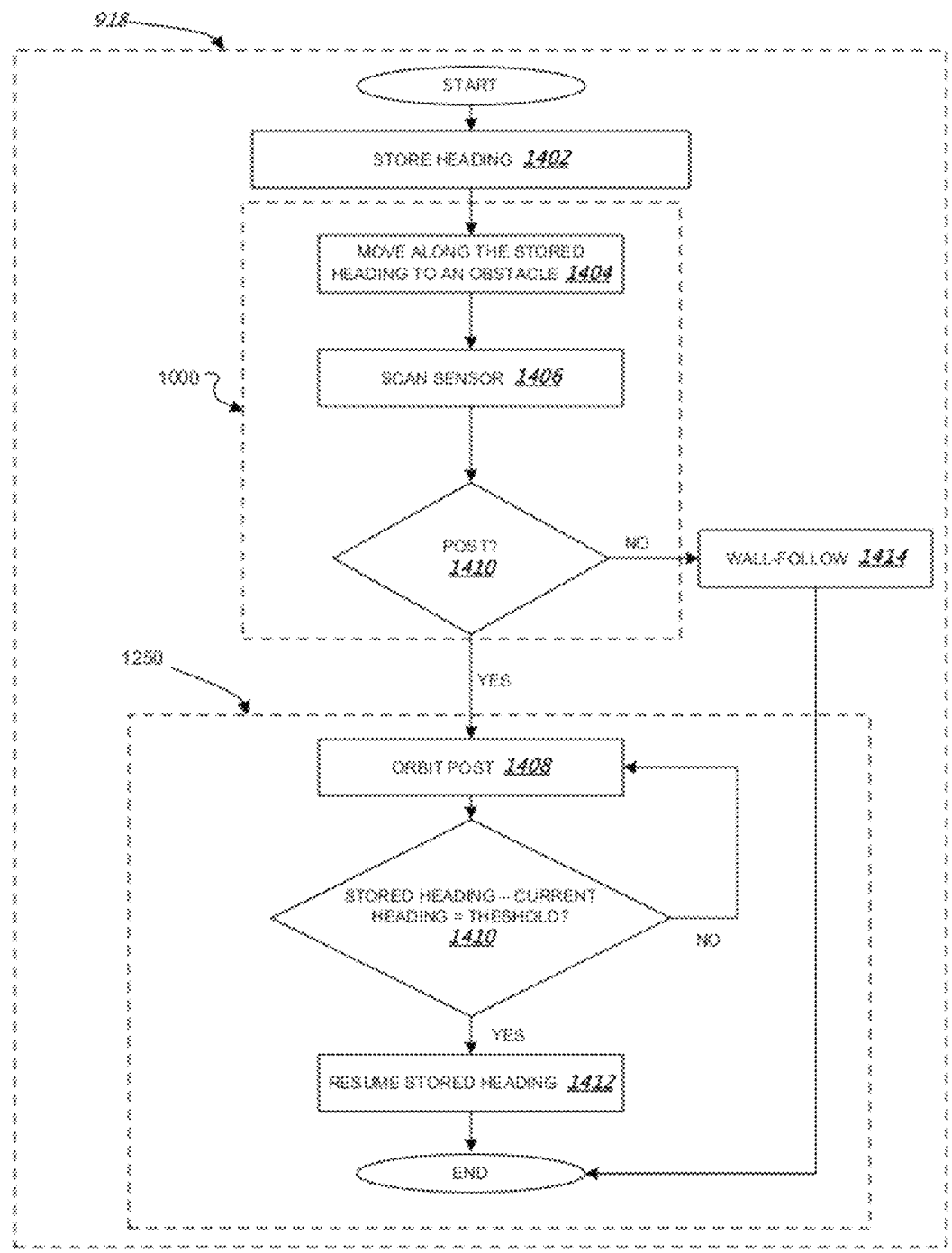
FIG. 8 shows a flow chart of obstacle classification in combination with post-orbit behavior as an arbiter-selected motion control behavior of an example autonomous coverage robot.

FIGS. 8 shows arbiter-selected motion control behavior 918 in which obstacle classification 1000 is combined with a post-orbit routine 1250 to move robot 100 around an obstacle that has been identified as a post.

In general, referring to FIG. 8, a heading H is stored 1402, robot 100 is moved 1404 along the stored heading H to an obstacle, a sensor (e.g., one or more of proximity sensors 134A-D) is scanned 1406. As described in further detail below, a determination 1410 is made regarding whether the obstacle is a post. If the determination 1410 is that the obstacle is not a post, robot 100 wall follows 1414 or moves according to one or more other arbiter-selected motion control behaviors. If the determination 1410 indicates that the obstacle is a post, the robot is moved according to a post-orbit routine 1250.

The post-orbit routine 1250 is described in further detail below. However, in general, the post-orbit routine 1250 includes orbiting 1408 the post, until the determination 1410 is made that the difference between the stored 1402 heading and the current heading of robot 100 is equal to a threshold (e.g., zero and/or a non-zero value), and resuming 1412 the stored 1402 heading when the determination 1410 of the threshold condition is met.

FIGS. 9A-9H show the sequence of movements of robot 100 during the combined obstacle classification 1000 and a post-orbit routine 1250 to move robot 100 around an obstacle that has been identified as a post. The sequence of movements shown in these figures shows the classification of a post using the left-most proximity sensor 134A and counterclockwise orbiting of the post. However, it should be appreciated that classification and orbiting of a post can be achieved by using the right-most proximity sensor 134D, with the directions of rotation reversed.

Figure 9A:
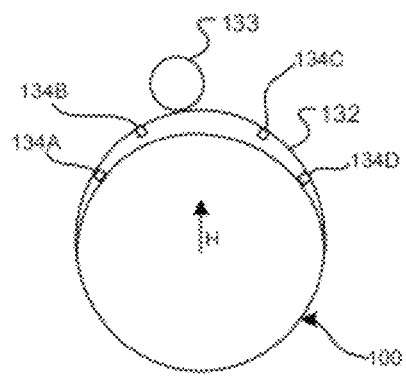
FIGS. 9A-9H show motion sequences of an example autonomous coverage robot to identify and circumnavigate an object.

As shown in FIG. 9A, robot 100 moves along a stored heading H until robot 100 is proximate to a post 133. For example, robot 100 can move along the stored heading H until one or more kinetic bump sensors 132 detect the post 133. Additionally or alternatively, robot 100 can move along the stored heading H until one or more proximity sensors 134A-134D detect post 133.

Figure 9B:
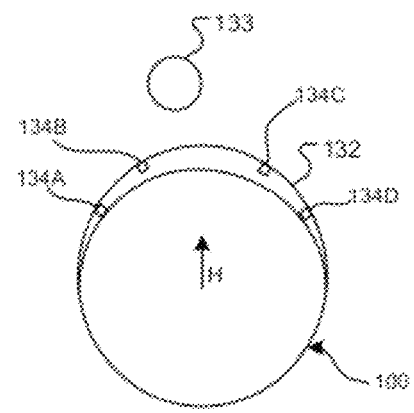

As shown in FIG. 9B, in some implementations, robot 100 backs away (e.g., directly opposite stored heading H) from post 133 after detecting proximity of post 133. The movement of robot 100 away from post 133 can allow proximity sensors 134A and 134D to be positioned sufficiently far from post 133 for optimal signal strength. Additionally or alternatively, such movement of robot 100 away from post 133 can reduce the likelihood that robot 100 would scrape or otherwise disturb post 133 as robot 100 orbits post 133.

Figure 9C:
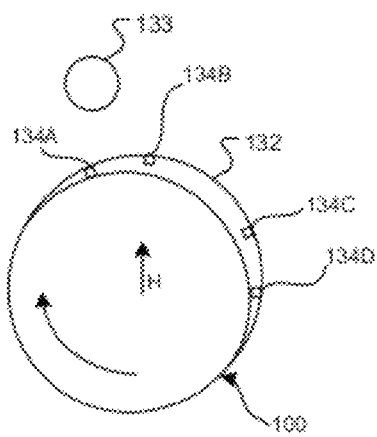

As shown in FIG. 9C, robot 100 is rotated in the direction of a proximity sensor disposed substantially on an end of robot 100. For example, robot 100 can be rotated toward proximity sensor 134A or proximity sensor 134D (each disposed substantially opposite one another on respective left and right sides of robot 100). In the instance shown in FIG. 9C, robot 100 is rotated clockwise toward the proximity sensor (proximity sensor 134A) that was closest to the position in which post 133 was detected. Such rotation of robot 100 toward the closest of the end proximity sensors 134A or 134D can, for example, reduce the time required to identify post 133 by reducing the amount of rotation required during obstacle classification 1000.

Figure 9D:
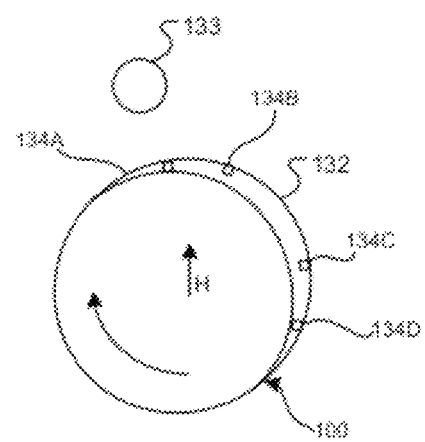

As shown in FIGS. 9C and 9D, robot 100 is rotated clockwise such that proximity sensor 134A moves past post 133. As described in further detail below with respect to the obstacle classification routine 1000, the signal received by robot 100 during the movement shown in FIGS. 9C and 9D allows robot 100 to determine the angular width of post 133. If the angular width is less than a threshold, the obstacle is classified as a post. It should be appreciated that the classification of an obstacle as a post does not necessarily require the object to be an actual post. Instead, the classification of an obstacle as a post is used herein as nomenclature for an object that can be circumnavigated like a post of similar width.

Figure 9E:
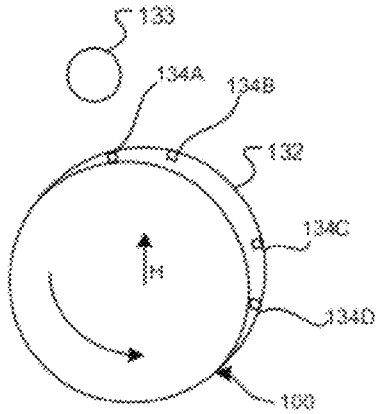

As shown in FIG. 9E, following the movement shown in FIGS. 9C and 9D, robot 100 is rotated counterclockwise to align the forward direction of travel parallel to the line tangent to the post 133 at the initial point of collision. This perpendicular alignment of robot 100 relative to post 133 can be achieved based on the known position of proximity sensor 134A and the sensed angular position of post 133. For example, at the end of the clockwise movement shown in FIG. 9D, the angular position of proximity sensor 134A is known relative to post 133 and the angular offset of the proximity sensor 134A is known relative to the geometry of robot 100. Therefore, perpendicular alignment of robot 100 can be achieved by rotating in place such that the forward direction of travel is parallel to the line tangent to post 133 at the point of initial collision. For example, once the angular position post 133 is determined by rotating robot 100 clockwise in place such that the proximity sensor 134A detects a peak signal at the end of obstacle classification 1000 (as shown in FIG. 9D), alignment of robot 100 is achieved by rotating counterclockwise in place by about 20 degrees for parallel alignment of the forward direction of the robot 100 with the line tangent to post 133 at the point of the initial collision (as shown in FIG. 9E).

Figure 9F:
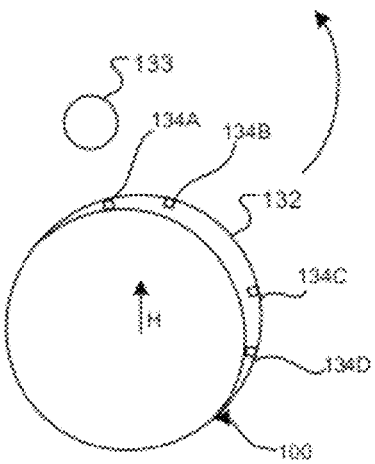

As shown in FIG. 9F, with robot 100 perpendicularly aligned with post 133, robot 100 can be orbited around post 133. For example, robot 100 can be orbited around post 133 by moving robot 100 in a counterclockwise direction with a turning radius greater than or equal to the diameter of robot 100. This can facilitate movement of robot 100 around at least a portion of post 133 to clean near post 133.

Figure 9G:
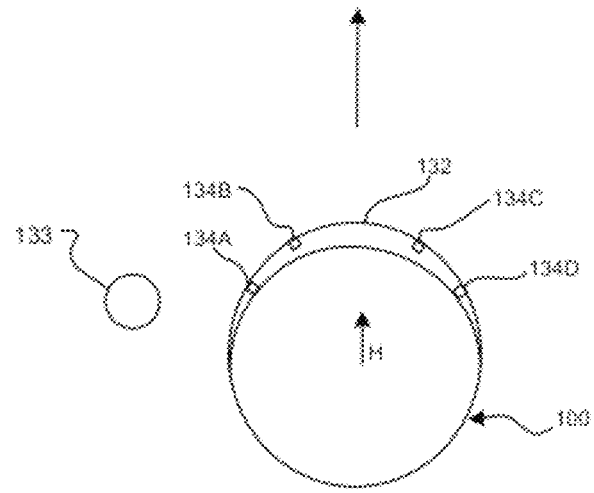

As shown in FIG. 9G, the orbiting initiated in FIG. 9F can continue until the instantaneous heading of robot 100 is equal to stored heading H and then robot 100 can move along stored heading H on a path that is substantially tangential to post 133. Such movement of robot 100 around post 133 can facilitate moving robot 100 along cleaning paths that are as long as possible (e.g., to maximize the amount of cleaning surface covered over a given period of time).

Figure 9H:
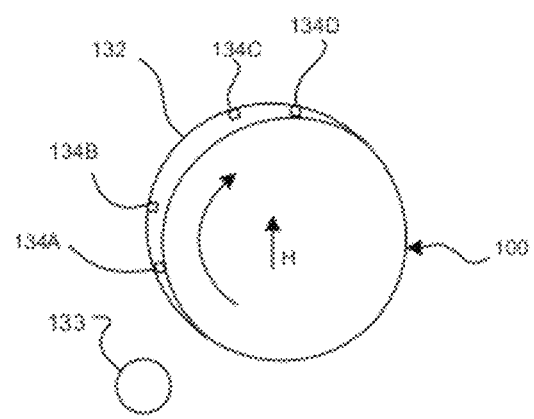

Additionally or alternatively, as shown in FIG. 9H, the orbiting initiated in FIG. 9F can continue until the difference between stored heading H and the instantaneous heading of robot 100 is equal to a threshold value. For example, robot 100 can be orbited around post 133 until the absolute value of the difference between the stored heading H and the instantaneous heading of robot 100 is equal to about 45 degrees. When this threshold condition is met, robot 100 can be rotated in place in the clockwise direction (i.e., the direction opposite the direction of orbit) to move robot 100 back toward stored heading H. This clockwise rotation of robot 100 back toward stored heading H can continue until the instantaneous heading of robot 100 is equal to stored heading H. Robot 100 can then continue along stored heading H. Thus, in these implementations, the net movement of robot 100 is to orbit robot 100 around post 133 to a position past stored heading H and then rotate robot 100 in place back toward stored heading H until the instantaneous heading of robot 100 is equal to stored heading H.

Figure 10A:
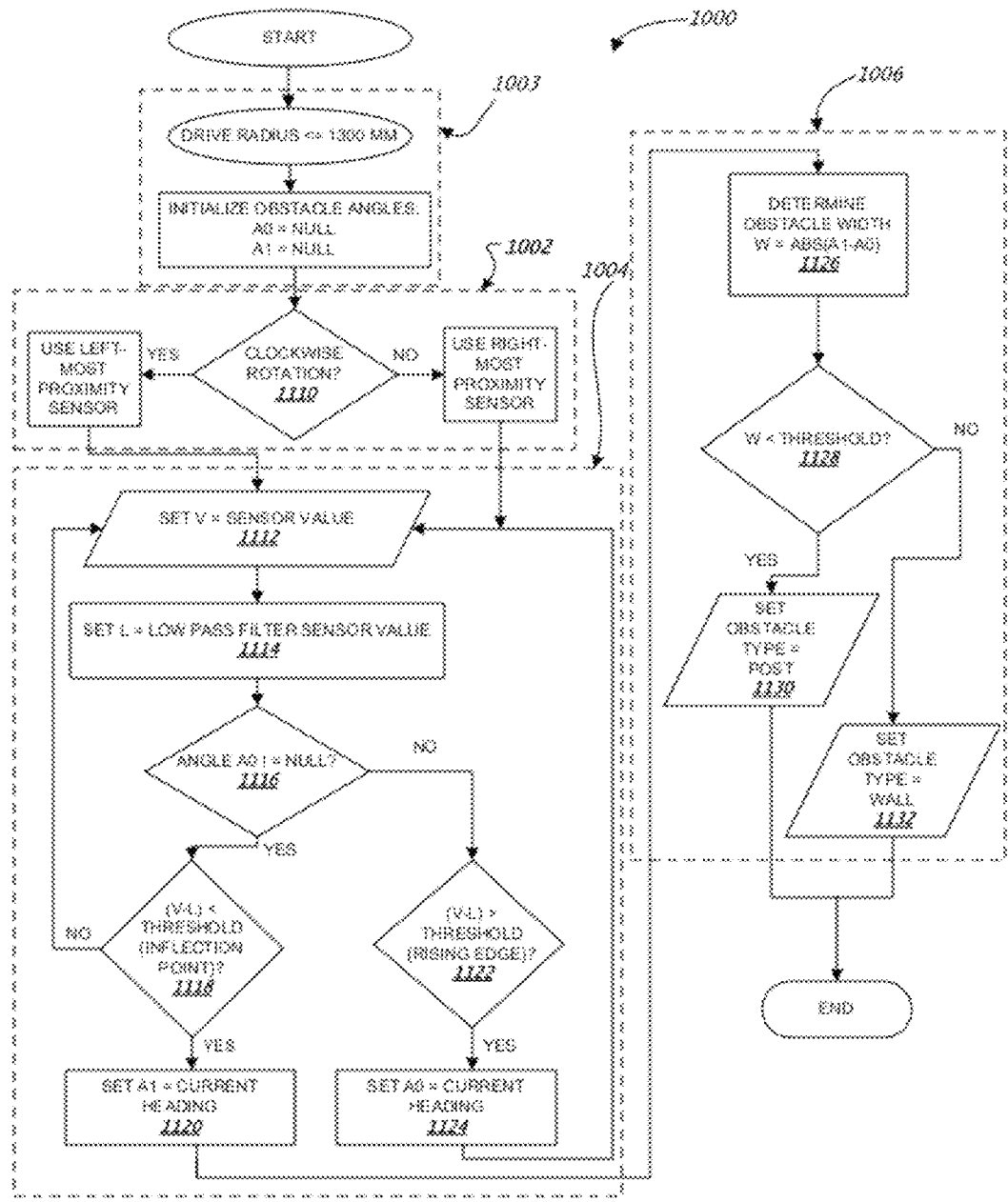
FIG. 10A shows a flow chart of an example of the obstacle classification of FIG. 7.
Figure 10B:
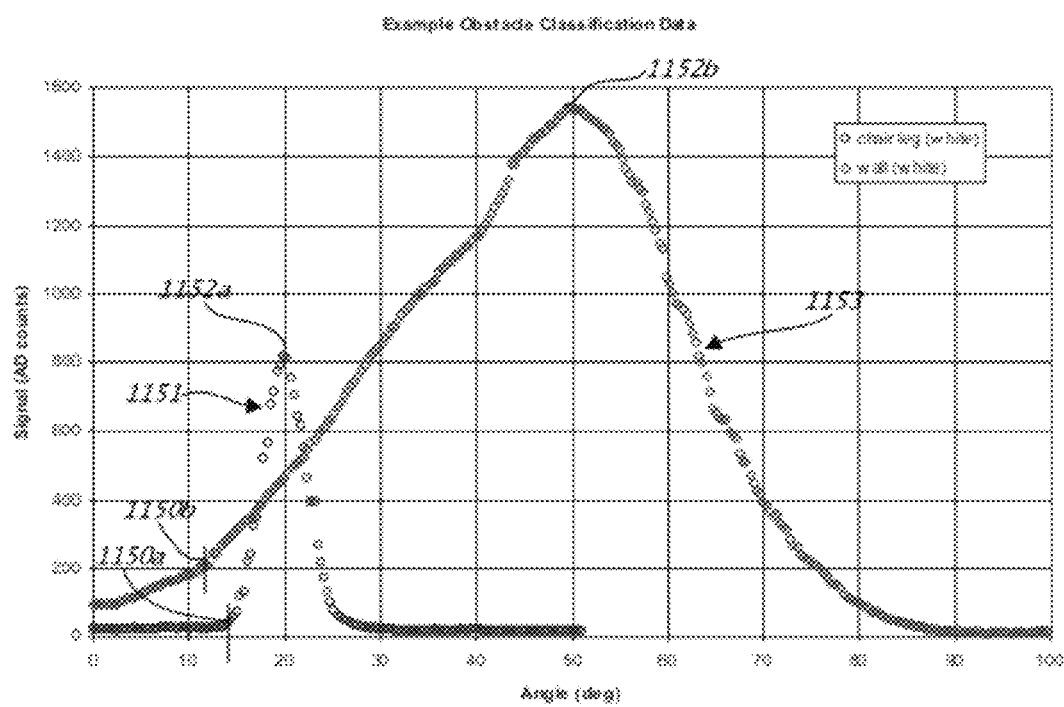
FIG. 10B shows an example of obstacle classification based on the obstacle classification of FIG. 10A.

FIGS. 10A-10B show an example of obstacle classification 1000 used to distinguish a white chair leg from a white wall. In this example, obstacle classification 1000 is initiated if the drive radius is less than about 2000 mm (e.g., less than about 1300 mm) and includes initializing 1003 a first A0 and a second A1 stored heading setting to zero.

Rotation 1002 of robot 100 away from the obstacle includes a determination 1110 of whether the robot is rotating in a clockwise direction. If robot 100 is determined 1110 to be rotating in a clockwise direction, the signal from the left-most proximity sensor 134A (shown in FIG. 4B) is processed. The signal from the right-most proximity sensor 134D (shown in FIG. 4B) is processed if robot 100 is determined to be rotating in the counterclockwise direction.

Determination 1004 of change in the received sensor signal includes receiving 1112 a substantially instantaneous sensor signal from the right-most 134A or left-most proximity sensor 134D. The instantaneous sensor signal is low-pass filtered 1114 such that the instantaneous sensor signal can be compared to the low-pass filtered 1114. As described in further detail below, the estimated angular width of the proximate obstacle is based at least in part on a comparison of the received 1112 and low-pass filtered 1114.

If the first stored heading setting A0 is determined 1116 to be at the initial value, controller 108 monitors 1122 whether the sensed signal from the proximity sensor 134A or 134D is at a rising edge 1150a,b. Monitoring 1122 for a rising edge (e.g., rising edges 1150a,b in FIG. 10B) includes comparing the difference between the received 1112 and low-pass filtered 1114 signals to a threshold (e.g. a non-zero value). If the difference is greater than the threshold, the first stored heading setting A0 is set 1124 to the current heading setting of the rotating robot 100. The current heading setting can be determined, for example, by the gyroscope 119 and/or by the one or more wheel encoders 121a,b,c (see FIG. 3).

If the first stored heading setting A0 is determined 1116 to be a value other than the initial value, controller 108 monitors 1118 whether the sensed signal from the proximity sensor 134A or 134D is at an inflection point (e.g., inflection points 1152a,b in FIG. 10B). Monitoring 1118 for an inflection point 1152a,b includes comparing the difference between the received 1112 and low-pass filtered 1114 signals to a threshold. If the difference is less than the threshold, the second stored heading setting A1 is set 1120 to the current heading setting of the rotating robot 100.

In some implementations, the threshold for monitoring 1122 for a rising edge is equal to the threshold for monitoring 1118 for an inflection point. Each of these thresholds can be greater than zero to reduce the likelihood of false positive determinations of rising edges and/or inflection points. In some implementations, one or both of the thresholds are set as part of a calibration process including receiving 1112 instantaneous and low-pass filtered 1114 sensor signals reflected from proximity sensor 134A or 134D directed at an object of known angular width.

Identifying 1006 the sensed obstacle includes calculating 1126 the angular width of the sensed obstacle, comparing 1128 the calculated 1126 angular width of the sensed obstacle to a threshold, and determining 1130 that the obstacle is a post (or, more generally, an object with the angular width characteristic of a post) if the calculated 1126 angular width of the sensed obstacle is less than the threshold. If the calculated 1126 angular width of the sensed obstacle is greater than or equal to the threshold, the obstacle is determined 1132 to be a wall (or another similarly wide object).

Calculating 1126 the angular width of the sensed obstacle is based at least in part on the absolute value of the difference between the first and second stored heading settings A0,A1. The absolute value of the difference between the first and second stored heading settings A0,A1 is half the angular width of the obstacle. It will be appreciated that this halved value of the angular width can be used as a proxy for the full angular width of the obstacle. Thus, unless specified to the contrary, the term angular width is used interchangeably herein in reference to the full angular width of the obstacle and the halved angular width of the obstacle.

The threshold used for comparison 1128 to the calculated 1126 angular width can be set based at least in part on the strength of the received 1001 sensor signal. For example, if the received 1001 sensor signal is weak, the threshold can be increased such that robot 100 will be less likely to execute a post-navigation or other circumnavigation behavior based on such a weak signal. In some implementations, the threshold used for comparison 1128 can be based at least in part on the calculated angular width of the obstacle.

FIG. 10B shows the received 1001 sensor signal as a function of angle for white chair leg 1151 and a white wall 1153. For the received 1001 signal corresponding to the white chair let 1151, the rising edge 1150a occurs at about 15 degrees and the inflection point 1152a occurs at about 20 degrees, resulting in a calculated 1126 angular width of 5 degrees. For the received 1001 signal corresponding to the white wall 1153, the rising edge 1150b occurs at about 13 degrees and the inflection point 1152b occurs at about 50 degrees, resulting in a calculated 1126 angular width of 37 degrees. Thus, in this example, the threshold used for comparison 1128 to the angular width can be set between about 5 degrees to about 37 degrees to distinguish a post (e.g., a chair leg) from a wall.

In some implementations, upon determination 1132 that the obstacle is a wall, a wall-following behavior can be used to move robot 100 along the wall at a substantially fixed distance to the wall by changing a turning radius of robot 100. For example, such a change in turning radius can include turning robot 100 in a first direction away from the sensed obstacle until the sensed obstacle is no longer detected and then turning robot 100 in a second direction toward the sensed obstacle. This wall-following behavior is disclosed in U.S. Pat. No. 7,388,343, entitled "Method and System for Multi-Mode Coverage for an Autonomous Robot," the entire contents of which are incorporated herein by reference.

In certain implementations, upon determination 1132 that the obstacle is a wall, a bounce behavior can be used to move robot 100 away from the wall to continue cleaning the cleaning surface. This bounce behavior is disclosed in U.S. Pat. No. 7,388,343, entitled "Method and System for Multi-Mode Coverage for an Autonomous Robot," the entire contents of which are incorporated herein by reference.

Further details regarding the operation of this aspect of the sensor subsystem 50, as well as alternative embodiments of sensors having utility in detecting contact with or proximity to stationary objects or obstacles can be found in commonly-owned, co-pending U.S. patent application Ser. No. 10/056,804, filed Jan. 24, 2002, entitled METHOD AND SYSTEM FOR MULTI-MODE COVERAGE FOR AN AUTONOMOUS ROBOT.

Upon determination 1130 that the obstacle is a post, robot can attempt to maneuver around the post through execution of one or more post-navigation behaviors. As described in further detail below, these post navigation behaviors can include post-orbit behaviors for maneuvering around the identified post and post-wiggle behaviors for maneuvering through small openings between obstacles.

Figure 11:
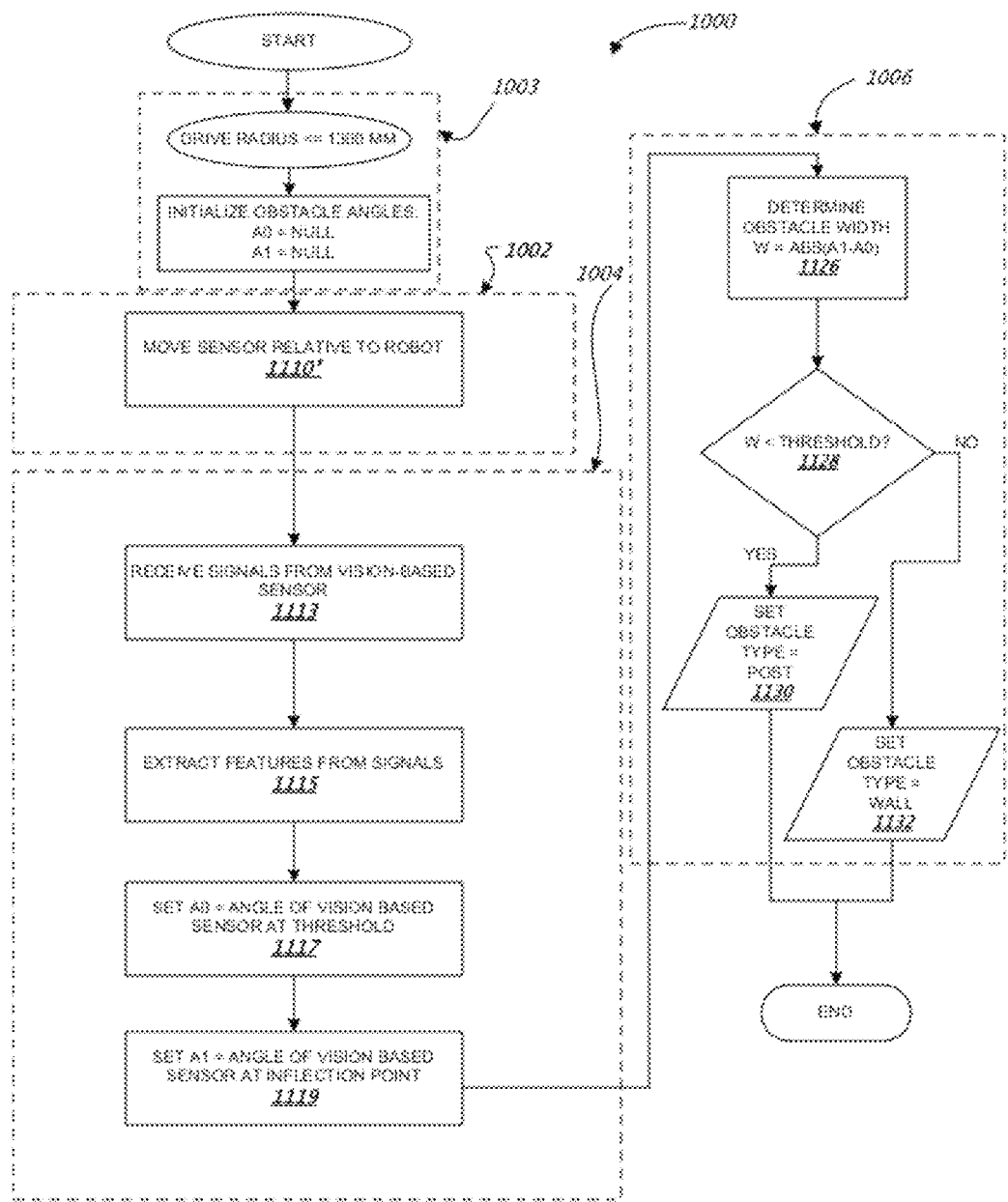
FIG. 11 shows a flow chart of an example of the obstacle classification of FIG. 7.

FIG. 11 shows an example of obstacle classification 1000 using a movable sensor carried by robot 100. In this example, obstacle classification 1000 is initiated if the drive radius is less than about 2000 mm (e.g., less than about 1300 mm) and includes initializing 1003 a first A0 and a second A1 stored heading setting to zero.

Rotation 1002 of the sensor away from the obstacle includes moving 1110' a sensor (e.g., an acoustic sensor and/or a vision-based sensor such as a camera, scanner, infrared, or laser) carried on robot 100. For example, one or more of proximity sensors 134A can be a vision-based sensor movable relative to robot 100 to span a field of view (e.g., a field of view ahead of robot 100). In some implementations, moving 1110' the vision-based sensor includes sweeping it across a 180 degree field of view forward of robot 100 in the direction of stored heading H. Such rotation of the vision-based sensor can be done while robot 100 remains stationary, which can reduce the amount of time required for obstacle classification 1000.

Determination 1004 of change in the received sensor signal includes receiving 1113 signals (e.g., images) from the vision-based sensor and extracting 1115 features from these signals. For example, in implementations in which the vision-based sensor is a camera, features can be extracted 1115 from the signals (images) obtained by the camera through the use of a Hough transform or other line classifier. In some implementations, the features extracted 1115 from the signals received 1113 from the vision-based sensor include a threshold determination of an edge of an obstacle and an inflection point corresponding approximately to a center of the width of the obstacle. The angle of the vision-based sensor corresponding to the threshold is set 1117 to A0. Similarly, the angle of the vision-based sensor corresponding to the inflection point is set 1119 to A1.

In this implementation, identifying 1006 the sensed obstacle based at least in part on the determined change in the received sensor signal can be achieved as described above with respect to FIGS. 10A-10B.

Figure 12:
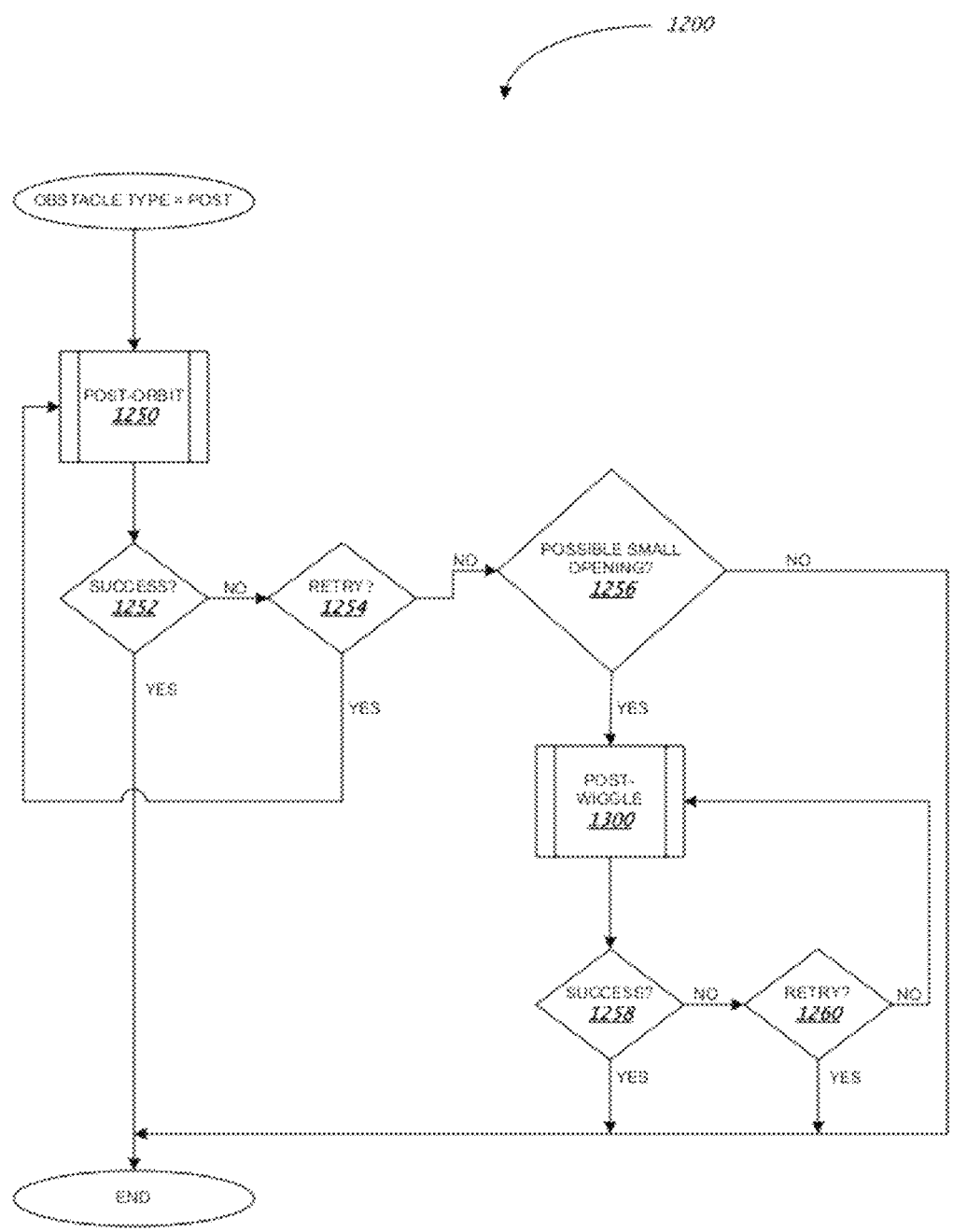
FIG. 12 shows a flow chart of post navigation of an example autonomous coverage robot.
Figure 13:
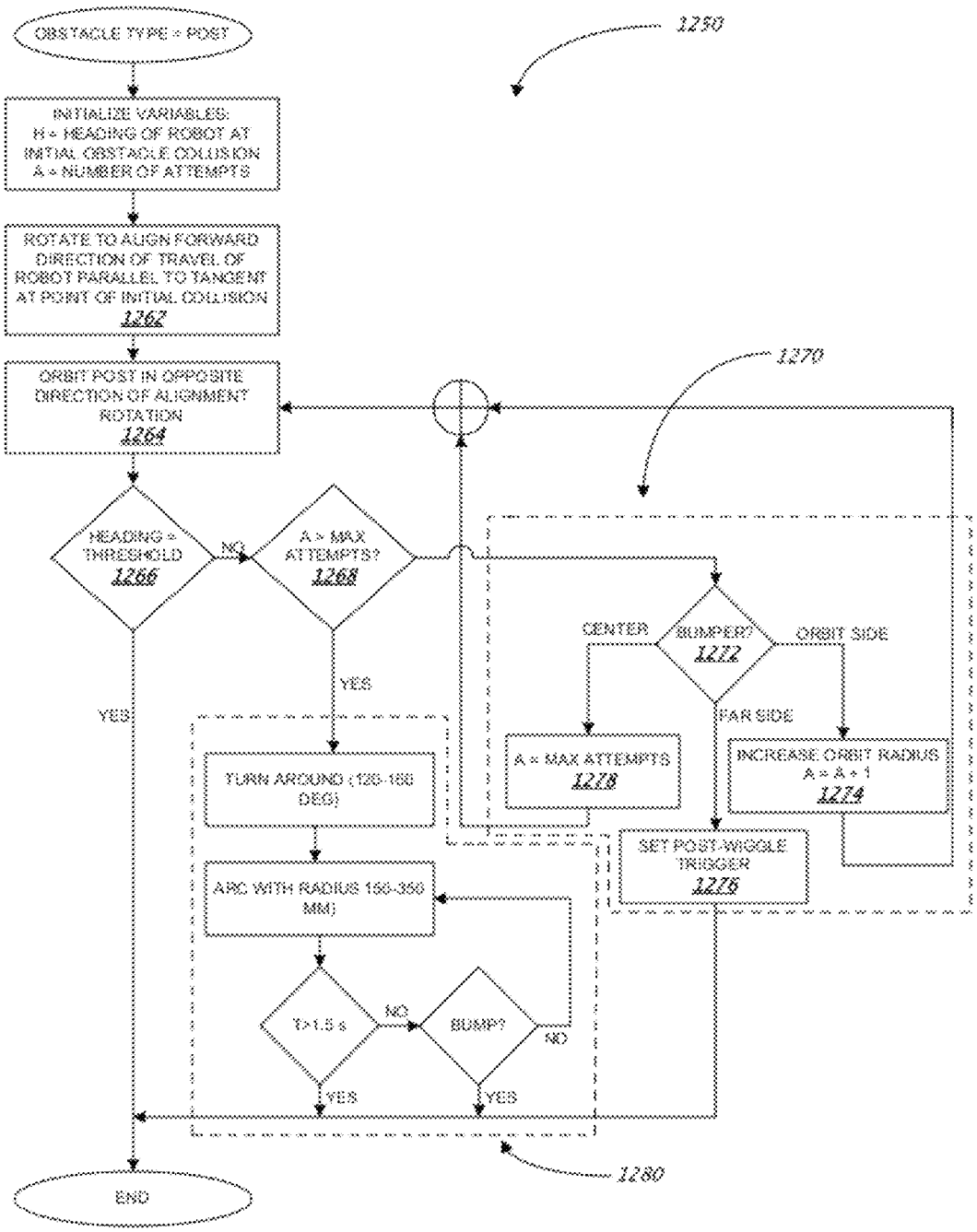
FIG. 13 shows a flow chart of post orbiting of an example autonomous coverage robot.
Figure 14:
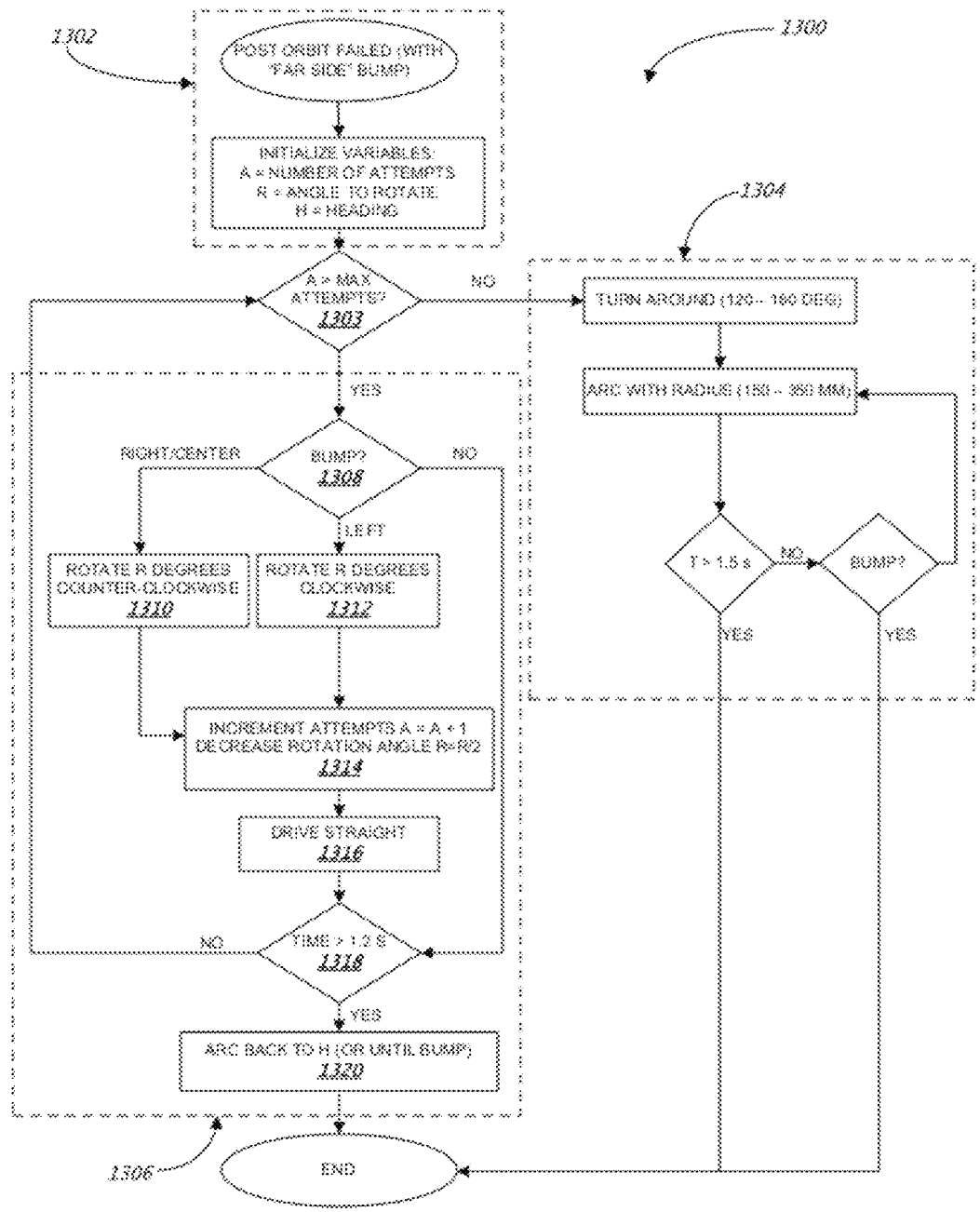
FIG. 14 shows a flow chart of post wiggle of an example autonomous coverage robot.

Referring to FIGS. 12-14, post navigation 1200 includes post-orbiting 1250 robot 100 and evaluating 1252 whether post-orbiting 1250 moved robot 100 around the obstacle. If post-orbiting 1250 is unsuccessful, determination 1254 is made regarding whether to retry post-orbiting 1250. If the robot 100 is determined 1256 to be near a possible small opening, robot 100 is post-wiggled 1300 to attempt to move through the possible small opening. The success of the post-wiggle 1300 is evaluated 1258 to determine whether robot 100 has maneuvered through the possible small opening. If post-wiggle 1300 is unsuccessful, determination 1260 is made regarding whether to retry post-wiggle 1300.

In some implementations, each determination 1254 and 1260 of whether to retry is based on whether the number of attempts has exceeded a fixed number of attempts. In certain implementations, each determination 1254 and 1260 of whether to retry is based on whether the number of attempts has exceeded a threshold proportional to the angular width of the post such that more attempts to execute the post-orbit 1250 and/or post-wiggle 1300 behaviors will be made for obstacles with larger angular widths. Additionally or alternatively, each determination 1254 and 1260 of whether to retry is based on whether the number of attempts has exceeded a threshold that decreases based on the amount of time robot 100 has been in operation in a cleaning mode.

As described above with respect to FIGS. 9A-9H, post-orbit 1250 can move robot 100 around an obstacle identified as a post such that robot 100 can resume the heading setting and, in some instances, the speed setting of robot 100 at the initial collision with the obstacle. Post orbit 1250 includes rotating 1262 robot 100 to align the forward direction of travel of robot 100 to be parallel to the tangent at the point of initial collision with post 133, orbiting 1264 in a direction opposite to the rotation 1262 for alignment, and determining 1266 whether the heading of robot 100 is equal to a threshold value. If the heading of robot 100 is determined 1266 to be different from the threshold value and the number of attempts to orbit the post is determined 1268 to be less than or equal to a maximum number, the orbit radius is progressively increased 1270. If the heading of robot 100 is determined 1266 to be different from the threshold value and the number of attempts to orbit the post is determined 1268 to be greater than the maximum number, robot 100 is turned 1280 through a large radius.

Rotating 1262 robot 100 to align the forward direction of travel to be parallel to the line tangent to post 133 at the point of initial collision includes rotating robot 100, as described above with respect to FIGS. 9A-9H.

Orbiting 1264 robot 100 in a direction opposite to rotation 1262 for alignment can include directing robot to turn toward the sensed obstacle. For example, if proximity sensor 134A (FIG. 4B) of robot 100 sensed the obstacle, orbiting 1264 includes rotating robot 100 in a counterclockwise direction, as viewed from above robot 100. In instances in which robot 100 is substantially cylindrical, orbiting 1264 can include turning robot 100 with a radius about equal to or slightly larger than (e.g., 1.8 times) the radius of robot 100. Additionally or alternatively, orbiting 1264 can include turning robot 100 with a radius based at least in part on the determined angular width of the obstacle. For example, robot 100 can be turned with a radius proportional to the determined angular width of the obstacle.

In some implementations, determining 1266 whether the heading of robot 100 is equal to a threshold value can include determining whether the heading of robot 100 is equal to the stored heading of the robot. In these embodiments, as shown in FIGS. 9F-9G, robot 100 is orbited about post 133 until the instantaneous heading of robot 100 is equal to the stored heading H, at which point the orbiting of robot 100 is interrupted and robot 100 moves along stored heading H on a path parallel to the original path prior to collision. Such circumnavigation of robot 100 about post 133 can reduce the amount of time require to move robot 100 past post 133, while still allowing robot 100 to clean near post 133.

In certain implementations, determining 1266 whether the heading of robot 100 is equal to a threshold value can include determining whether difference between the stored heading H and the instantaneous heading of the orbiting robot 100 is equal to a threshold value (e.g., ±45 degrees). In these embodiments, as shown in FIGS. 9F and 9H, robot 100 is orbited about post 133 until the instantaneous heading of robot 100 differs from the stored heading H by a threshold value (e.g., an absolute value to account for clockwise and counterclockwise rotation), at which point the orbiting of robot 100 is interrupted and robot 100 is turned in the direction opposite the direction of orbit (FIG. 9H) until the instantaneous heading of robot 100 equals the stored heading H. Robot 100 then continues along stored heading H. Such circumnavigation of robot 100 about post 133 improve the coverage of robot 100 in the vicinity of post 133, for example, by allowing robot 100 to move about a larger portion of the circumference of post 133.

Progressively increasing 1270 the orbit radius identifying 1272 which kinetic bump sensors 132 was triggered as robot 100 attempted to orbit the post (e.g., which kinetic bump sensor 132 corresponds to the bump that prevented robot 100 from resuming the initial heading). For example, in the implementations shown in FIG. 10, identification 1272 is between an orbit-side kinetic bump sensor 132, a far-side kinetic bump sensor 132, and a center kinetic bump sensor 132.

If the identified kinetic bump sensor 132 is on the orbit-side of robot 100 (e.g., on the left side of robot 100 during a counterclockwise turn or on the right side of robot 100 during a clockwise turn), the orbit radius is increased 1274. For example, the orbit radius can be increased by about 10 mm to about 100 mm per attempt. Additionally or alternatively, the orbit radius can be increased during each attempt by an amount proportional to the angular width of the detected post such that the increased 1274 in orbit radius is larger for posts of larger angular width than it is for posts of smaller angular width.

If the identified kinetic bump sensor 132 is on the far-side of robot 100 (e.g., on the right side of robot 100 during a counterclockwise turn or on the left side of robot 100 during a clockwise turn), a post-wiggle trigger is set 1276. If robot 100 fails to move around the post by post-orbit 1250, this post-wiggle trigger can allow robot 100 to execute post-wiggle 1300, as described below.

If the identified kinetic bump sensor 132 is on the center of robot 100, number of attempts is set 1278 to the maximum number of attempts such that the robot 100 will make one more attempt to orbit the post before robot 100 is turned 1280 through a large radius.

Turning 1280 robot 100 through a large radius can reduce the time and energy spent by robot 100 in making unsuccessful attempts to orbit the post. For example, turning 1280 robot 100 through a large radius can facilitate movement of robot 100 past an irregularly shaped post. In some implementations, robot 100 is turned 1280 through an arc with a radius of about 100 mm to about 500 mm (e.g., about 150 mm to about 350 mm). In certain implementations, robot 100 is turned around (e.g., about 100 degrees to about 180 degrees) before it is moved through a large radius. If a bump is detected as robot 100 moves through the large turn radius, the post orbiting 1250 ends and, in some implementations, another arbiter-selected motion control behavior is initiated. This can improve the efficiency of robot 100 in moving around the obstacle. If robot 100 is turned 1280 through the large radius arc for more than a period of time (e.g., about 1 second to about 5 seconds), the post orbiting 1250 behavior ends. By the time the large radius arc is timed out, robot 100 is likely beyond the obstacle and/or another arbiter-selected behavior may be more effective in moving robot 100 toward the initial heading setting.

Referring to FIG. 14, post-wiggle behavior 1300 includes maneuvering robot 100 through a series of progressively smaller rotations in alternating directions to move through a space between two obstacles. Such maneuvering can allow robot 100 to move through the space to resume an initial heading setting (e.g., the heading setting prior to initial contact with the obstacle). The space between the obstacles can be approximately equal to the largest dimension of robot 100, parallel to the cleaning surface.

Post-wiggle 1300 includes initializing 1302 variables, determining 1303 whether the maximum number of attempts to move through the space has been reached, turning 1304 robot 100 through a large radius turn if the maximum number of attempts has been reached (or if a maximum amount of time has elapsed), and wiggling 1306 robot 100 relative to the space if the maximum number of attempts has not been reached.

Initialization 1302 can include determining whether the post-wiggle trigger was set 1276 by a far-side bump while post-orbiting 1250 the obstacle (see FIG. 13). Such a far-side bump and, thus the post-wiggle trigger, can indicate that robot 100 has encountered an orientation of obstacles spaced close to one another. If the post-wiggle trigger has not been set, the post-wiggle behavior 1300 can end. Additionally or alternatively, initiating 1302 the wiggling variables can include setting one or more of the following variables:

number of attempts for post-wiggling, rotation angle R for the wiggle movement, and the initial heading of robot 100. In some instances, the maximum number of attempts for post-wiggling decreases with the amount of time that robot 100 has spent in the cleaning mode.

Turning 1304 robot 100 through a large radius turn if the maximum number of attempts has been reached is analogous to turning 1280 described above with respect to post-orbit 1250 (FIG. 10).

Wiggling 1306 includes detecting 1308 a bump, rotating 1310 robot 100 counterclockwise by the rotation angle R upon detection 1308 of a right and/or center bump, rotating 1312 robot 100 clockwise by the rotation angle R upon detection 1308 of a left bump, decreasing 1314 the rotation angle R, and driving 1316 straight. Such progressive decreases 1314 in the rotation angle R in response to detected 1308 bumps can be repeated until detection 1318 that a maximum number of attempts has been exceeded or until robot 100 is able to move forward freely 1318 and arc 1320 back toward the heading H until the heading H is reached or until a bump is sensed. Upon detection 1303 that a maximum number of attempts has been exceeded, robot 100 is turned 1304 toward a random heading about opposite H and moved to arc forward for a predetermined time or distance, or until a bump is sensed.

In some implementations, decreasing 1314 rotation angle R can include reducing the rotation angle R by a fixed amount. In certain implementations, decreasing 1314 rotation angle R can include reducing rotation angle R by progressively smaller amounts with each iteration.

Figure 15:
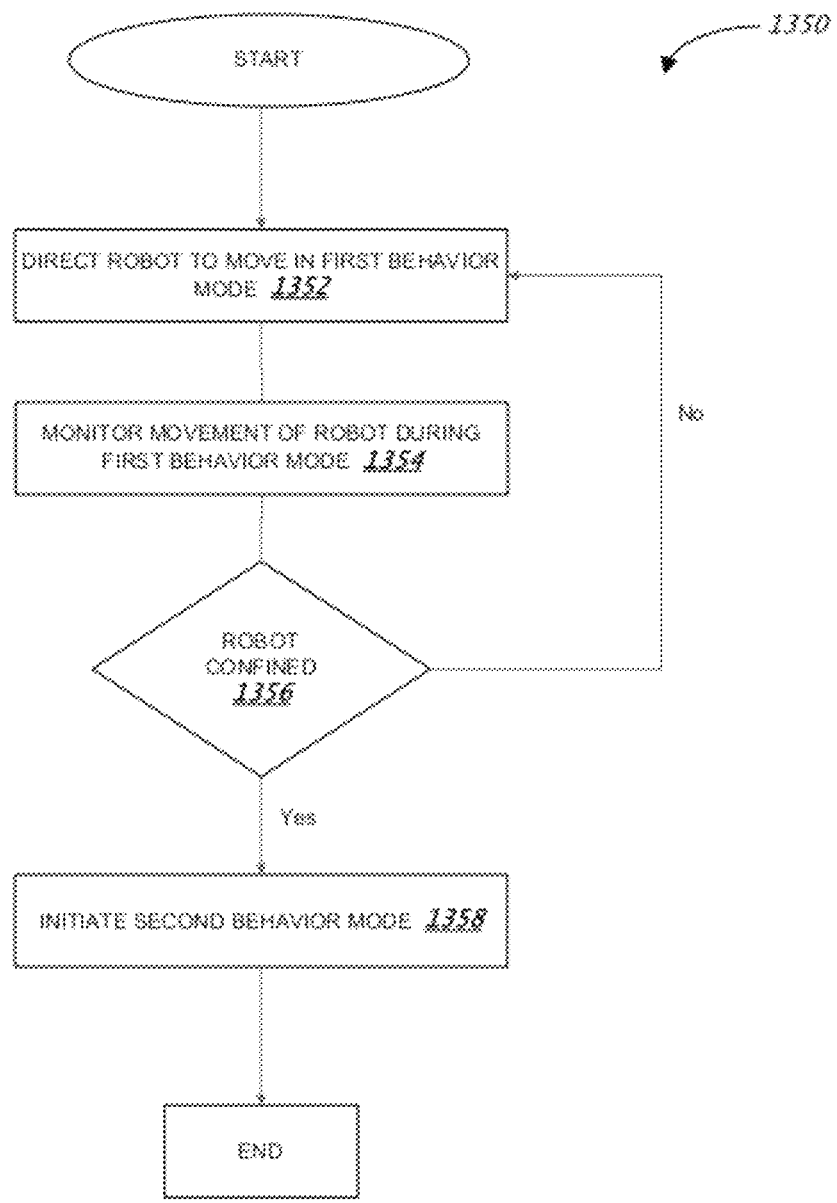
FIG. 15 shows a flow chart of a caged robot virtual sensor of an example autonomous coverage robot.

Referring to FIG. 15, a caged robot virtual sensor 1350 can detect whether robot 100 is confined to a small area. For example, caged robot virtual sensor 1350 can detect whether robot 100 has navigated into an area that is difficult move away from (e.g., such that robot 100 is substantially confined to that area). As described in further detail below, caged robot virtual sensor 1350 can attempt to move robot 100 out of the confined area by switching robot 100 to alternative behavior modes. Thus, in some instances, caged robot virtual sensor 1350 can improve robot coverage efficiency of a cleaning surface by, for example, reducing the likelihood that robot 100 will remain confined in an area.

Caged robot virtual sensor 1350 includes directing 1352 robot 100 to move in a first behavior mode, monitoring 1354 movement of robot 100 in the first behavior mode, determining 1356 whether robot 100 is confined, and initiating 1358 a second behavior mode upon determining 1356 that robot 100 is confined. In some implementations, caged robot virtual sensor 1350 is activated upon determination that robot 100 is in a cluttered area (e.g., by one or more signals received from proximity sensors 134A-D and/or kinetic bump sensors 132 in FIGS. 4A-B and 5).

Directing 1352 robot 100 to move in a first behavior mode can include directing the robot to move in post-orbit 1250 and/or post-wiggle 1300 behaviors (see FIGS. 13-14). Additionally or alternatively, directing 1352 robot 100 to move in a first behavior mode can include directing robot 100 to move through a set of behavior modes. The first behavior mode or set of behavior modes can, additionally or alternatively, include one or more of the following behavior modes: a bounce mode, an obstacle following mode, and a spot coverage mode.

Monitoring 1354 movement of robot 100 during the first behavior mode can include measuring the heading of robot 100 and measuring the linear distance traveled by robot 100. This monitoring 1354 can be done over a period of time, during a behavior mode, and/or during a set of behavior modes. In some implementations, the measured heading of robot 100 includes measurements from gyroscope 119 and/or by one or more wheel encoders 121a,b,c (FIG. 3).

Determining 1356 that robot 100 is confined can include determining that monitored 1354 movement of robot 100 includes a heading change of 360 degrees or more and a measured linear movement of robot 100 of less than a threshold value (e.g., less than about 6 meters, less than about 4 meters, less than about 2 meters). This combination of changes in heading and linear movement indicates that robot 100 is confined to a small area. For example, the linear movement of robot 100 can be measured by one or more of wheel encoders 121a,b,c.

Upon determining 1356 that robot 100 is confined, a second behavior mode is initiated 1358. For example, the second behavior mode can include an escape mode. Additionally or alternatively, initiating 1358 the second behavior mode can include providing an alarm (e.g., an audible alarm, a visual alarm) and/or shutting off power to robot 100.

In some implementations, determining 1356 that robot 100 is confined includes generating a local area map based at least in part upon determining the distance between contacted obstacles. For example, the local area map can be generated by storing the heading of robot 100 upon initial contact with a first obstacle and, upon initial contact with the second obstacle, using dead reckoning to determine the distance between the first and second obstacle. The speed or distance information used for dead reckoning can include odometry information from the one or more wheel encoders 121a,b,c and/or motor power information from the drive wheel assemblies 112, 114.

A number of implementations have been described. Nevertheless, it will be understood that various modifications may be made without departing from the spirit and scope of the following claims. Accordingly, other implementations are within the scope of the following claims.

What is claimed is:

1. A method of navigating an autonomous coverage robot on a floor, the method comprising:
controlling movement of the robot across the floor in a cleaning mode along a stored heading;
receiving a sensor signal indicative of a nearing obstacle;
in response to receiving the sensor signal indicative of the obstacle, reducing a speed of the coverage robot across the floor prior to contact with the obstacle;
subsequent to reducing the speed of the coverage robot, controlling movement of the robot to cause the robot to rotate in a clockwise direction and in a counterclockwise direction;
determining a change in a received sensor signal during at least a portion of rotation of the robot in the clockwise direction and in the counterclockwise direction;
determining a width of the obstacle based at least in part on the determined change in the received sensor signal;
controlling movement of the robot based on the determined width of the sensed obstacle, including:
in response to determining that the width of the sensed obstacle is less than a threshold, navigating the autonomous robot according to a first behavior in which the robot travels to an opposite side of the obstacle and then resumes movement along the stored heading, the first behavior comprising directing the robot to execute an orbiting routine comprising turning toward the sensed obstacle using an orbit radius based on the determined width of the sensed obstacle and increasing the orbit radius in response to a failure to move around the object by the orbiting routine.

2. The method of claim 1 wherein receiving the sensor signal indicative of the obstacle comprises determining an increase in the received sensor signal strength.

3. The method of claim 1 wherein determining the change in the received sensor signal comprises determining a peak in the strength of the received sensor signal.

4. The method of claim 3 wherein determining the peak in the strength of the received sensor signal comprises low pass filtering the received sensor signal and comparing the low pass filtered sensor signal to an instantaneous sensor signal.

5. The method of claim 3 wherein determining the width of the sensed obstacle comprises storing a first robot heading associated with the received sensor signal indicative of the obstacle and storing a second robot heading associated with the determined peak in the received sensor signal.

6. The method of claim 5 wherein determining the width of the sensed obstacle further comprises determining the width of the sensed obstacle based at least in part on the difference between the stored first and second robot headings.

7. The method of claim 1 wherein the threshold is set based at least in part on the strength of the received sensor signal and/or the width of the obstacle.

8. The method of claim 6 wherein the robot defines a fore-aft axis and the sensor signal, indicative of the obstacle, is received from one of a first sensor and a second sensor, the first sensor and the second sensor disposed on respective right and left sides of the fore-aft axis.

9. The method of claim 1 wherein navigating the autonomous robot according to the first behavior further comprises in response to reaching a preset number of attempts at orbiting the object via the orbiting routine, discontinuing the orbiting routine and executing a post-wiggle trigger comprising a plurality of rotations in alternating directions.

10. The method of claim 9 wherein the robot is substantially cylindrical and directing the robot to turn toward the sensed obstacle comprises turning the robot with a radius greater than or equal to the radius of the robot.

11. The method of claim 10 wherein the robot is directed to turn with a radius about equal to the radius of the robot to about 1.8 times the radius of the robot.

12. The method of claim 9 wherein directing the robot to turn toward the sensed obstacle comprises directing the robot to turn until the first robot heading is reached and, upon reaching the first robot heading, directing the robot to move along a substantially straight path corresponding to the first robot heading.

13. The method of claim 1 wherein the orbit radius is progressively increased in proportion to an angular width of the detected object.

14. The method of claim 1 wherein navigating the autonomous robot according to the second behavior comprises maneuvering the robot to follow the sensed obstacle at a substantially fixed distance by changing a turning radius of the robot.

15. The method of claim 1 further comprising, subsequent to reducing the speed of the coverage robot and prior to controlling movement of the robot to cause the robot to rotate in a clockwise direction and in a counterclockwise direction, controlling movement of the robot to cause the robot to back away from the obstacle by moving along a heading that is opposite of the stored heading.

16. The method of claim 1 further comprising scanning for a second obstacle after resuming movement along the stored heading.

17. The method of claim 1 wherein navigating the autonomous robot according to the first behavior comprises causing the robot to:
follow an arcuate path about the obstacle with a side brush of the robot cleaning against the obstacle until the robot has reached the opposite side of the obstacle, and then to
resume the stored heading.

18. The method of claim 17 wherein the robot is cylindrical and wherein causing the robot to follow an arcuate path comprises turning the robot toward the sensed obstacle with a turning radius of between 1 and 1.8 times the radius of the robot.

19. The method of claim 17 wherein causing the robot to follow an arcuate path comprises turning the robot toward the sensed obstacle with a turning radius determined as a function of the determined width of the obstacle.

20. The method of claim 17 wherein causing the robot to follow the arcuate path about the obstacle comprises operating a side brush of the robot to clean against the obstacle during the first behavior.

21. The method of claim 1 wherein navigating the autonomous robot according to the second behavior comprises navigating the autonomous robot according to a bounce mode.

22. The method of claim 1 wherein navigating the autonomous robot according to the second behavior comprises navigating the autonomous robot according to a wall following mode.

23. The method of claim 1 further comprising:
sensing the obstacle by contacting the obstacle; and
backing away from the obstacle before causing the robot to rotate in the clockwise direction and in the counterclockwise direction.

24. A method of navigating an autonomous coverage robot on a floor, the method comprising:
storing a heading of the autonomous coverage robot;
moving the autonomous coverage robot in a cleaning mode along the stored heading to an obstacle;
receiving a sensor signal indicative of a nearing obstacle along the heading;
in response to receiving the sensor signal indicative of the nearing obstacle, moving the autonomous coverage robot away from the obstacle along a heading that is opposite of the stored heading;
scanning the obstacle with a sensor carried on the autonomous coverage robot to determine an angular width of the obstacle;
classifying the obstacle based at least in part on whether the determined angular width is above or below a threshold; and
maneuvering the robot as a function of the classification of the obstacle, according to an algorithm including:
in response to classifying the obstacle based on the determined angular width being below the threshold:
orbiting the autonomous coverage robot around at least a portion of the classified obstacle based on an orbiting routine while comparing the stored heading to the heading of the autonomous coverage robot during orbiting of the classified obstacle, wherein the orbiting routine comprises turning the autonomous coverage robot toward the sensed obstacle using an orbit radius based on the determined angular width of the sensed obstacle and increasing the orbit radius in response to a failure to move around the object by the orbiting routine; and resuming the stored heading based at least in part on the comparison of the stored heading to the heading of the autonomous coverage robot during orbiting; and in response to classifying the obstacle based on the determined angular width being above the threshold, turning the robot and maneuvering the robot away from the obstacle along a revised heading.

25. The method of navigating the autonomous coverage robot of claim 24 wherein resuming the stored heading comprises interrupting orbiting of the autonomous coverage robot if the heading of the autonomous coverage robot during orbiting equals the stored heading.

26. The method of navigating the autonomous coverage robot of claim 24 wherein resuming the stored heading comprises turning the autonomous coverage robot toward the stored heading.

27. The method of navigating the autonomous coverage robot of claim 24 wherein orbiting the autonomous coverage robot comprises moving the autonomous coverage robot with a radius greater than a turning perimeter of the autonomous coverage robot.

28. The method of navigating the autonomous coverage robot of claim 24 wherein scanning the sensor carried on the autonomous coverage robot comprises turning the autonomous coverage robot to move the sensor.

29. The method of navigating the autonomous coverage robot of claim 24 wherein scanning the sensor carried on the autonomous coverage robot comprises moving the sensor relative to the autonomous coverage robot.

30. The method of navigating the autonomous coverage robot of claim 24 wherein the sensor comprises one or more of the following: a camera, a laser, and a proximity sensor, and an acoustic sensor.

31. The method of claim 24 further comprising:
sensing the obstacle by contacting the obstacle; and
backing away from the obstacle before scanning the obstacle.

32. A method of navigating an autonomous coverage robot on a floor, the method comprising:
controlling movement of the robot across the floor in a cleaning mode;
receiving a sensor signal indicative of an obstacle;
rotating the robot away from the sensed obstacle;
determining a change in the received sensor signal during at least a portion of the rotation of the robot away from the sensed obstacle;
determining a width of the obstacle based at least in part on the determined change in the received sensor signal; and
controlling movement of the robot based on the determined width of the sensed obstacle including:
in response to determining that the width of the sensed obstacle is less than a threshold, navigating the autonomous robot according to a first behavior in which the robot travels to an opposite side of the obstacle and then resumes movement along the stored heading, the first behavior comprising directing the robot to execute an orbiting routine comprising turning toward the sensed obstacle using an orbit radius based on the determined width of the sensed obstacle and increasing the orbit radius in response to a failure to move around the object by the orbiting routine.

* * * * *